US 6,553,431 B1

(12) United States Patent
Yamamoto et al.

(10) Patent No.: US 6,553,431 B1
(45) Date of Patent: Apr. 22, 2003

(54) INFORMATION PROCESSING SYSTEM AND INFORMATION PROCESSING METHOD

(75) Inventors: Masahito Yamamoto, Tokyo (JP); Makoto Takayama, Yokohama (JP); Koji Kajita, Yokohama (JP); Hideaki Shimizu, Yokohama (JP); Akira Negishi, Fujisawa (JP); Shin Muto, Kawasaki (JP); Naoki Tsuchitoi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/358,480

(22) Filed: Jul. 21, 1999

(30) Foreign Application Priority Data

Jul. 22, 1998 (JP) .......................................... 10-221147
Dec. 28, 1998 (JP) .......................................... 10-372235
Dec. 28, 1998 (JP) .......................................... 10-372238

(51) Int. Cl.$^7$ ............................. G06F 3/00; G06F 13/00
(52) U.S. Cl. ............................. 710/8; 710/10; 709/232; 358/1.13; 358/448
(58) Field of Search .................. 710/8, 10; 709/232; 358/1.13, 448

(56) References Cited

U.S. PATENT DOCUMENTS

| 5,123,063 A | * | 6/1992 | Ohkubo | .................... 382/318 |
| 5,396,345 A | * | 3/1995 | Motoyama | .................. 358/448 |
| 5,933,580 A | * | 8/1999 | Uda et al. | .................. 358/1.13 |
| 5,935,217 A | * | 8/1999 | Sakai et al. | .................. 709/249 |

* cited by examiner

Primary Examiner—Jeffrey Gaffin
Assistant Examiner—Tammara Peyton
(74) Attorney, Agent, or Firm—Fitzpatrick, Cella, Harper & Scinto

(57) ABSTRACT

Each of input and output devices previously forms device profile, and a host computer acquires virtual input/output device information including a pair of ideal input and output devices on the basis of the device profiles of these devices. If the virtual input/output device information is acquired, the input device demands to acquire a transfer path profile included in the virtual input/output device information, and then demands if the transfer path profile is acquired the output device registered in the acquired transfer path profile to connect a line. If the line connection is established, the input device performs data inputting such that the acquired transfer path profile is reflected in the device setting, and then it transfers the input data to the desired output device.

50 Claims, 38 Drawing Sheets

FIG. 7

| | |
|---|---|
| DEVICE PROFILE #1 | |
| DEVICE TYPE ; | INPUT DEVICE/IMAGE SCANNER |
| DEVICE ID ; | SCAN 5 |
| NETWORK ADDRESS ; | 172.16.10.2 |
| TRANSFER PROTOCOL ; | FTP,LPD |
| DATA PROC RESOLUTION ; | 400,600,1200 |
| PAPER SIZE ; | A4,A5,B4 |
| DATA FORMAT; | JPEG,GIF,LIPSIV |

FIG. 10

| | |
|---|---|
| TRANSFER PATH PROFILE #2 | |
| DESCRIPTION; | "COPY SCAN 5 TO LP5-3,LP5-1" |
| INPUT DEVICE; | SCAN 5 |
| NETWORK ADDRESS OF INPUT DEVICE; | 172.16.10.2 |
| CONNECTION DEVICE; | LP5-3,LP5-1 |
| OUTPUT DEVICE; | LP5-3 |
| NETWORK ADDRESS OF OUTPUT DEVICE; | 172.16.10.10 |
| TRAY STAGE OF PAPER DISCHARGE DESTINATION; | LOWER STAGE |
| TRANSFER PROTOCOL; | LPD |
| DATA PROCESS RESOLUTION; | 600 |
| PAPER SIZE; | A4 |
| DATA FORMAT; | LIPSIV |
| OUTPUT DEVICE; | LP5-1 |
| NETWORK ADDRESS OF OUTPUT DEVICE; | 172.16.10.5 |
| PAPER DISCHARGE TRAY; | OPTIONAL |
| TRANSFER PROTOCOL; | LPD |
| DATA PROCESS RESOLUTION; | 600 |
| PAPER SIZE; | A4 |
| DATA FORMAT; | LIPSIV |

```
VIRTUAL INPUT AND OUTPUT DEVICES #3
TRANSFER PATH PROFILE ;      #2
USER PROFILE ;               #○○○○
DISPLAY COMMENT ;            "COPY : LP5-3,LP5-1 ; ××"
```

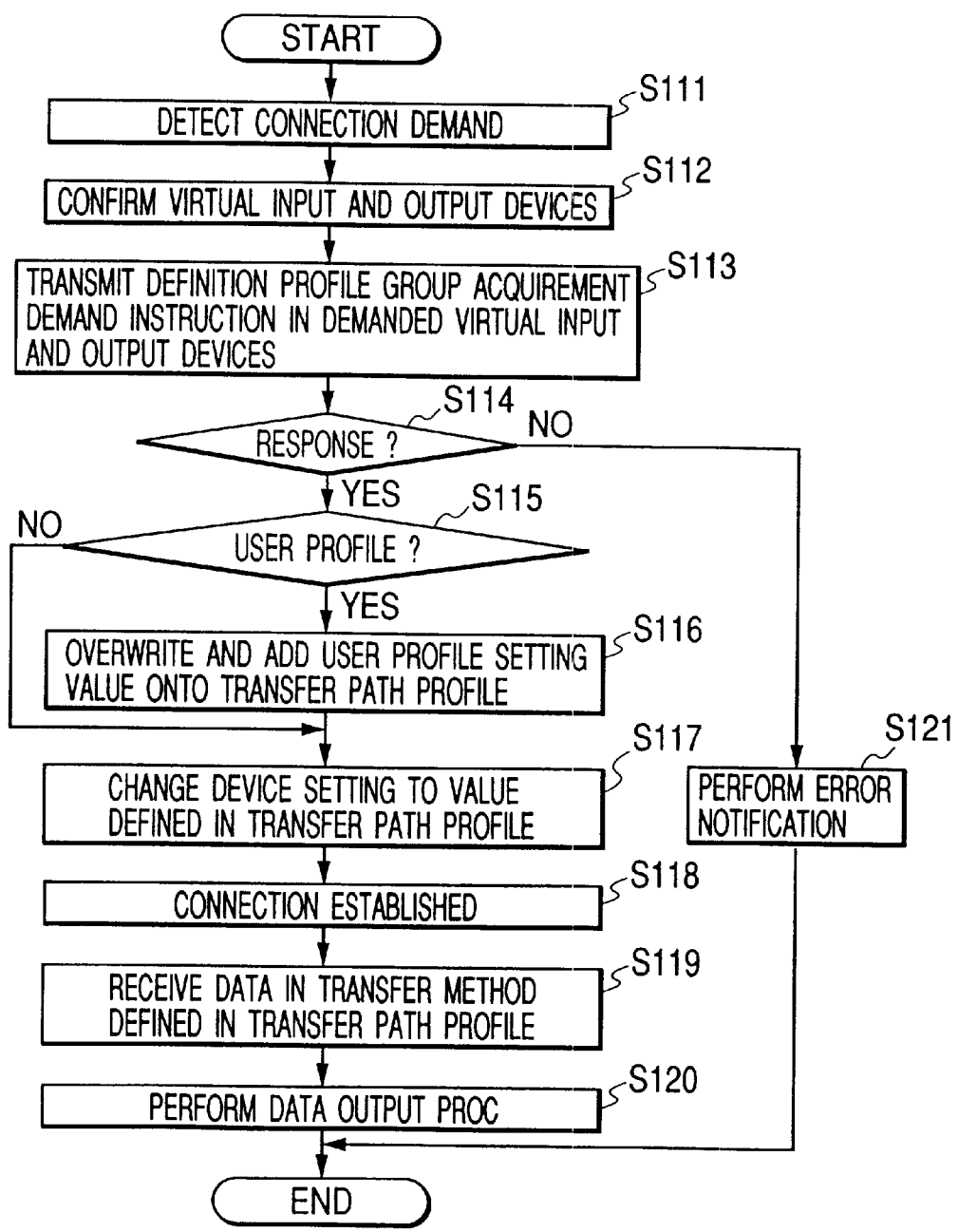

FIG. 23

```
DEVICE PROFILE #3da{
  DEVICE - TYPE ;        INPUT - DEVICE/SCANNER
  DEVICE - ID ;          SCANNER - XXX
  DEVICE - ADDRESS ;     172.16.10.2
  TRANSMISSION - MODE ;  FTP,LPD
  RESOLUTION ;           400,600,1200
  MEDIA - SIZE ;         A4,A5,B4
  DATA - FORMAT ;        JPEG,GIF,LIPSIV
}
```

FIG. 24

```
TRANSMISSION PATH PROFILE #234{
  INPUT - DEVICE ;       SCANNER - XXX
  INPUT - ADDRESS ;      172.16.10.2
  OUTPUT - DEVICE ;      LBP - XXX
  OUTPUT - ADDRESS ;     172.16.10.10
  OUTPUT - TRAY ;        LOWER
  TRANSMISSION - MODE ;  LPD
  RESOLUTION ;           600
  MEDIA - SIZE ;         A4
  DATA - FORMAT ;        LIPSIV
}
```

FIG. 25

```
USER PROFILE #taro11{
  USER ;                taro
  RESOLUTION ;          600
  OUTPUT TRAY ;         MANUAL
  TRANSMISSION - MODE ; LPD
  MEDIA - SIZE ;        A4
  DATA - FORMAT ;       LIPSIV
  ERROR - LOG ;         file ://server.xxx.co.jp/usr/taro/log/#time.log
}
```

FIG. 26

```
VIRTUAL DEVICE #413a{
  TRANSMISSION PROFILE ; #234
  USER PROFILE ;         #taro11
  DISPLAY COMMENT ;      "VIRTUAL COPIER (taro11)"
}
```

FIG. 33

| | |
|---|---|
| DEVICE - TYPE ; | INPUT - DEVICE/SCANNER |
| DEVICE - ID ; | SCANNER - XXX |
| DEVICE - ADDRESS ; | 172.16.10.2 |
| RESOLUTION ; | 400,600,1200 |
| MEDIA - SIZE ; | A4,A5,B4 |
| INPUT - SPEED ; | A4 - 20sec |
| INPUT - FEE ; | A4 - 16bit/8yen |
| DOCUMENT - FORMAT ; | JPEG,GIF,LIPSIV |
| INPUT - COMMAND ; | A4/REQ A4 - SCAN, |
| | A5/REQ A5 - SCAN, |
| | B4/REQ B4 - SCAN |

FIG. 34

| | |
|---|---|
| DEVICE - TYPE ; | OUTPUT - DEVICE/LBP |
| DEVICE - ID ; | LBP - XXX |
| DEVICE - ADDRESS ; | 172.16.10.3 |
| RESOLUTION ; | 300,600 |
| MEDIA - SIZE ; | A3,A4,A5,B4 |
| OUTPUT - SPEED ; | A4 - 6sec |
| OUTPUT - FEE ; | A4 - MONO/10yen |
| DOCUMENT - FORMAT ; | LIPSIV,N201,ESC/P |

REQ DEVICE-PROFILE

```
⎧ SEND DEVICE - PROFILE
⎪ DEVICE - TYPE ;         INPUT - DEVICE/SCANNER
⎪ DEVICE - ID ;           SCANNER - XXX
⎨ DEVICE - ADDRESS ;      172.16.10.2
⎪ RESOLUTION ;            400,600,1200
⎪ MEDIA - SIZE ;          A4,A5,B4
⎪ INPUT - SPEED ;         A4 - 20sec
⎪ INPUT - FEE ;           A4 - 16bit/8yen
⎪ DOCUMENT - FORMAT ;     JPEG, GIF, LIPSIV
⎪ INPUT - COMMAND ;       A4/REQ A4 - SCAN,
⎪                         A5/REQ A5 - SCAN,
⎪                         B4/REQ B4 - SCAN
⎩ END_OF_PROFILE
```

FIG. 39

{
DESCRIPTION ;      COPY SCANNER - XXX TO LBP - XXX
INPUT - DEVICE ;      SCANNER
OUTPUT - DEVICE ;      LBP
INPUT - ADDRESS ;      172.16.10.2
OUTPUT - ADDRESS ;      172.16.10.3
DOCUMENT - FORMAT ;      LIPSIV
COPY - DEFAULT ;      1
RESOLUTION ;      600dpi
INPUT - COMMAND ;      A4/REQ A4 - SCAN,
                         A5/REQ A5 - SCAN,
                         B4/REQ B4 - SCAN
}

FIG. 41

REQ TRANSMISSION - PATH - PROFILE

```
{  SEND TRANSMISSION - PATH - PROFILE
   DESCRIPTION ;        COPY SCANNER - XXX TO LBP - XXX
   INPUT - DEVICE ;     SCANNER
   OUTPUT - DEVICE ;    LBP
   INPUT - ADDRESS ;    172.16.10.2
   OUTPUT - ADDRESS ;   172.16.10.3
   DOCUMENT - FORMAT ;  LIPSIV
   COPY - DEFAULT ;     1
   RESOLUTION ;         600dpi
   INPUT - COMMAND ;    A4/REQ A4 - SCAN,
                        A5/REQ A5 - SCAN,
                        B4/REQ B4 - SCAN
   END_OF_PROFILE
```

FIG. 44

{ USER ;            KAJIMA
  GROUP ;           DESIGN,PROJECT
  PASSWORD ;        1234
  INPUT - DEVICE ;  SCANNER001,
                    SCANNER008
  OUTPUT - DEVICE ; LBP07,
                    LBP05

FIG. 46

REQ TRANSMISSION - USER - PROFILE

```
⎧ SEND TRANSMISSION – USER PROFILE
⎪ USER ;             KAJIMA
⎪ GROUP ;            DESIGN, PROJECT
⎨ PASSWORD ;         1234
⎪ INPUT – DEVICE ;   SCANNER001,
⎪                    SCANNER008
⎪ OUTPUT – DEVICE ;  LBP07,
⎪                    LBP05
⎩ END_OF_PROFILE
```

FIG. 52
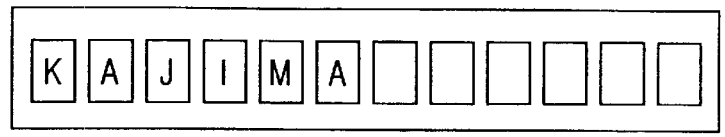
FIG. 53
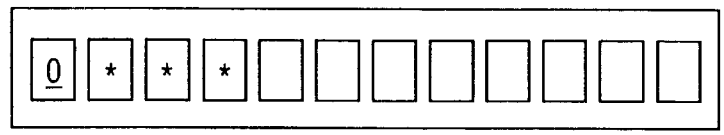
FIG. 54
REQ TRANSMISSION – USER – PROFILE MATCH INPUT – ADDRESS=172.16.10.2 ;
FIG. 55
REQ TRANSMISSION – PATH – PROFILE MATCH INPUT – ADDRESS=172.16.10.2

INFORMATION PROCESSING SYSTEM AND INFORMATION PROCESSING METHOD

BACKGROUND OF THE INVENTION

1. Field of the Invention

The present invention relates to an information processing system and an information processing method executed in this system, and more particularly to an information processing system composed of input and output devices connected to a network and an information processing method executed in this system.

2. Related Background Art

In recent years, it has been widely developed and studied an information processing system in which plural monofunctional devices such as input devices (e.g., image scanner, digital camera and the like) and output devices (e.g., printer, fax machine and the like) are connected together to provide a so-called multifunction by combining functions of these monofunctional devices.

As the information processing system of this type, it has been already known a multifunctional system in which, after communication data input by the input device is once stored in a memory of a host computer, the communication data is transmitted to the specific output device selected by a user with a console of the host computer.

Further, as the information processing system of this type, it has been already proposed a digital copying machine having a so-called multicopying function in which the image scanner and the plural printers (cluster printers) are connected together through a connection cable and copy outputting can be performed plural times corresponding to the number of connected printers on the basis of one reading operation to a one-page original.

However, in the former system (multifunctional system), as above, after the communication data is once transferred from the input device to the host computer, the user must select the output device and transfer the communication data to the selected output device. Thus, there is the problem that the handling is complicated as compared with a case where the user operates the simplex copying machine itself.

Further, since the communication data is transferred from the input device to the output device through the host computer, there is the problem that it takes a long processing time during which the communication data is initially input and finally output.

Further, since a sufficient storage area must be secured in the host computer to once store therein the communication data, there is the problem that it is necessary to install a large-capacity memory in the host computer, whereby the system is expensive as a whole.

In the latter system (multicopying system), since the input and output devices are directly connected to each other through the connection cable, it is possible to shorten a transfer time and effectively use resources. However, in a case where the numerous input and output devices are combined with others through the network, since there are numerous connection patterns capable of combining the input device and the plural output devices with others, there is the problem that the method to designate the output device (i.e., transfer destination) from the input device is complicated, thereby excessively cumbering the user himself with the handling.

Further, when the specific output device is selected from among the plural output devices to output the communication data, such the specific output device is selected by handling the console unit of the input device. In this case, there is the problem that numerous buttons corresponding to the number of output devices are necessary on the console unit, or a quantity of information to be displayed on the console unit must be increased. Thus, like the former system, the system is expensive as a whole.

Hereinafter, a conventional example that the scanner acting as the input device and the printer acting as the output device are combined with each other to realize the copying function will be explained as a example of the multifunctional device.

In one method, after the user goes to the position at which the scanner is placed and sets the original intended to be copied onto the scanner, he goes to the position at which a client host computer is placed and executes the image reading from the original set on the scanner, and then the copying function is realized by designating the outputting to the printer. In the other method, the user designates the destination of the read data by using the console panel of the scanner, and the data is printed by the printer at the designated destination, whereby the copying function is realized.

Further, in a case where such the devices are shared by the plural users, an ID card or the like is issued for each department to designate the usable devices.

However, in the former method, it is necessary for the user to expressly move to the position at which the client host computer is placed and designate scan execution and printing execution in order to realize the copying function. Such working is laborious and inconvenient for the user as compared with a case where the user handles a copying machine (scanner and printer are directly integrated) being.

In the latter method, since the method that the destination is designated from the scanner is complicated, the user is burdened. Also, since it is necessary to enlarge the display screen on the console panel and provide numerous buttons to newly realize the complicated designation method, the cost of the scanner increases.

Further, restriction and management on the use of the devices by the ID card or the like are unsuitable for flexible setting of the individual.

SUMMARY OF THE INVENTION

The present invention has been made in consideration of the above problems, and an object thereof is to provide an information processing system, an information processing method executed in this system, input and output devices and an information processing device, in which high-speed processing to communication data can be performed at low cost and the desired output device can be selected from among the plural output devices.

An another object of the present invention is to provide an information processing system and an information processing method executed in this system, in which an arbitrary output device is selected from an input device and input data is transmitted to the selected output device and subjected to output processing.

Still another object of the present invention is to provide an information processing system and an information processing method executed in this system, in which input and output devices and a transfer method are set for each user and input data from the input device is transmitted to the set output device and subjected to output processing.

That is, the present invention provides an information processing system in which at least one or more input device for inputting data, plural output devices for outputting the input data, and an information processing device for controlling processing of the data are connected to others through a network, wherein the information processing device comprises
device information acquirement means for acquiring device information of the input device and the output device,
search means for searching for the output device capable of outputting the data input from the input device on the basis of the acquirement result of the device information acquirement means, and
registration means for registering virtual input/output device information on the basis of the device information of the input and output devices detected by the search means, and the input device comprises
virtual device information acquirement means for acquiring the virtual input/output device information, and
transfer means for directly transferring the data to the output device designated by the virtual input/output device information.

Further, the present invention provides an information processing method for an information processing system in which at least one or more input device, plural output devices and an information processing device are connected to others through a network, and the output device is designated to output data input from the input device, wherein the information processing device acquires device information of the input device and the output device, searches for the output device capable of outputting the data input from the input device on the basis of the acquired device information, and registers virtual input/output device information on the basis of the device information of the searched and detected input and output devices, and the input device acquires the virtual input/output device information, and then directly transfers the data to the output device designated by the virtual input/output device information.

Further, the present invention provides an input device which is connected to plural output devices and an information processing device through a network, comprising:

virtual device information acquirement means for acquiring virtual input/output device information;
transfer method information acquirement means for acquiring transfer method information included in the virtual input/output device information; and
transfer means for directly transferring data to the output device designated by the virtual input/output device information, on the basis of the transfer method information.

Further, the present invention provides an output device which is connected to at least one or more input device and an information processing device through a network, comprising:

virtual device information confirmation means for confirming whether or not output designation is made by virtual input/output device information generated by the information processing device;
data reception means for receiving data directly transferred from the input device based on transfer method information included in the virtual input/output device information when the output designation is confirmed by the virtual device information confirmation means; and output means for outputting the data received by the data reception means.

Further, the present invention provides an information processing device which is connected to at least one or more input device and plural output devices through a network, comprising:

device information acquirement means for acquiring device information of the input device and the output device;
judgment means for judging whether or not the output device capable of outputting data input from the input device exists, on the basis of the acquirement result of the device information acquirement means;
transfer method information generation means for generating transfer method information on the basis of the respective device information of the output and input devices, when it is judged by the judgment means that the output device capable of outputting the data from the input device exists;
registration means for registering virtual input/output device information including the transfer method information.

Other objects, advantages and salient features of the present invention will become apparent from the detailed description which, taken in conjunction with the annexed drawings, disclose the preferred embodiments of the present invention.

BRIEF DESCRIPTION OF THE DRAWINGS

FIG. 7 is a view showing a device profile formed in the image scanner;

FIG. 10 is a view showing a transfer path profile formed in the host computer;

FIG. 22 is a flow chart showing processing in which the virtual profile is used by an output device;

FIG. 23 is a view showing an example of the device profile;

FIG. 24 is a view showing an example of a transfer path profile;

FIG. 25 is a view showing an example of a user profile;

FIG. 26 is a view showing an example of a definition file of virtual input and output devices;

FIG. 33 is a view showing an example of a device profile in the network scanner;

FIG. 34 is a view showing an example of a device profile in the network printer;

FIG. 39 is a view showing a structural example of a transfer path profile

FIG. 41 is a view showing a structural example of a transfer path profile demand instruction;

FIG. 44 is a view showing a structural example of a user profile;

FIG. 46 is a view showing a structural example of a user profile demand instruction;

FIG. 52 is a view showing the contents of the liquid crystal panel displayed when a rightward key on a crisscross panel is depressed once;

FIG. 53 is a view showing the contents of the liquid crystal panel displayed after the user profile is selected;

FIG. 54 is a view showing an instruction text obtained by expanding a user profile transfer demand instruction; and FIG. 55 is a view showing an instruction text obtained by expanding a transfer path profile transfer demand instruction.

DETAILED DESCRIPTION OF PREFERRED EMBODIMENTS

Hereinafter, the embodiments of the present invention will be explained with reference to the annexed drawings.

(First Embodiment)

Figure 1:
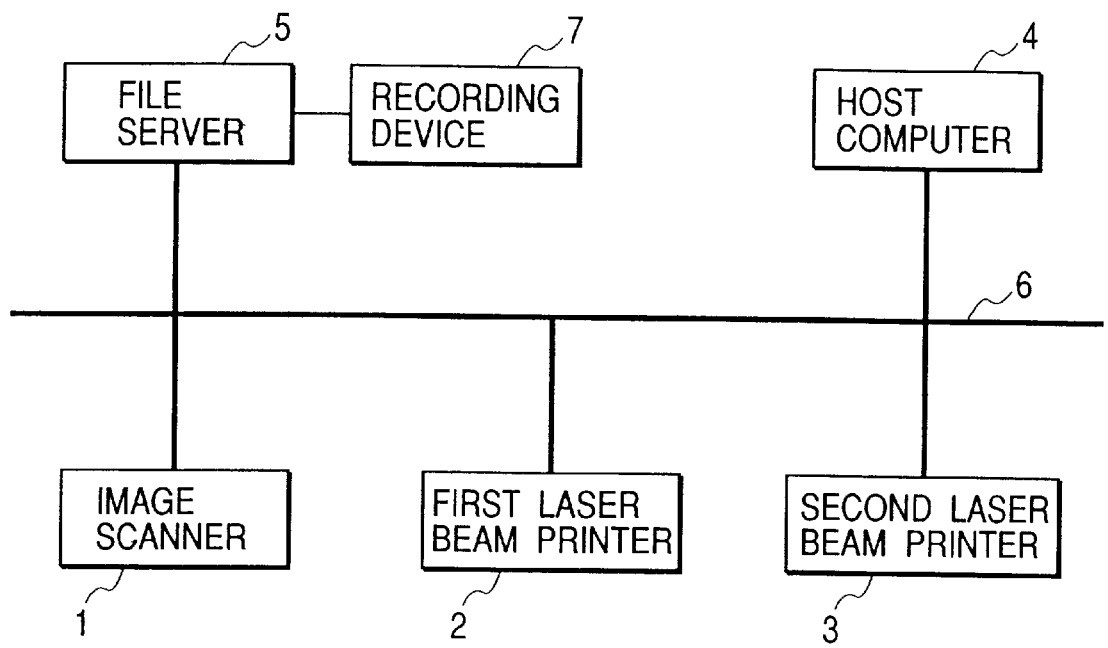
FIG. 1 is a structural view showing a multifunctional system as an information processing system according to the first embodiment of the present invention.

FIG. 1 is a structural view showing a multifunctional system as an information processing system according to the first embodiment of the present invention. In the multifunctional system, an image scanner 1 which acts as an input device to read image data, plural (i.e., first and second) laser beam printers 2 and 3 which act as output devices to output the image data, a host computer 4 which acts as an information processing device, and a file server 5 which integrally manages a later-described device profile and the like are connected to a LAN (local area network) 6 through a not-shown LAN interface such as an Ethernet interface (e.g., 10BASE-2) having a coaxial cable. Further, a recording device 7 such as a hard disk or the like is connected to the file server 5. Although the unique network scanner and the two laser beam printers are connected to the LAN in FIG. 1, the number of these scanner and printers are merely determined by way of example. That is, many more devices may be connected to the LAN.

Figure 2:
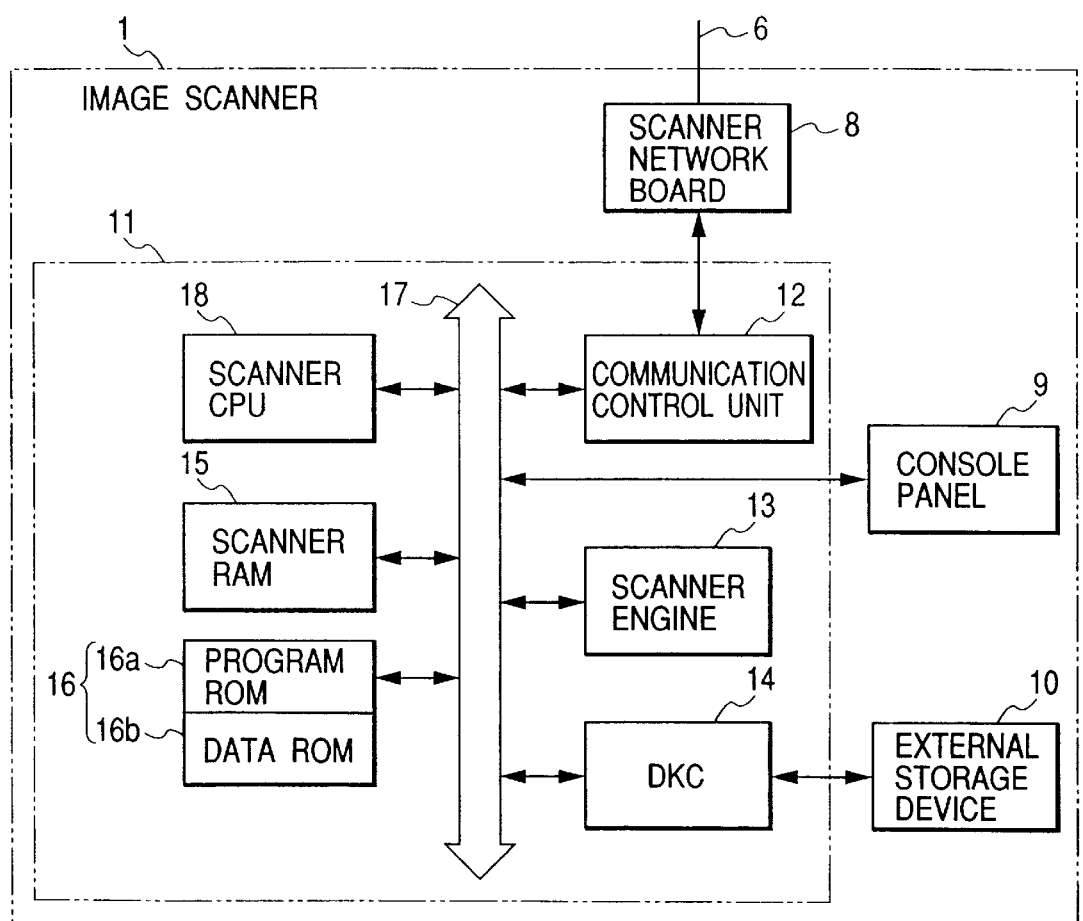
FIG. 2 is a block diagram showing the details of an image scanner acting as an input device.

FIG. 2 is a block diagram showing the details of the image scanner 1. The image scanner 1 is composed of a scanner network board 8 which is connected to the LAN 6, a console panel 9 which includes various switches, a liquid crystal panel and the like, an external storage device 10 such as a hard disk, an IC (integrated circuit) card or the like, and a scanner control body unit 11 which is connected to the board 8, the panel 9 and the device 10.

The scanner network board 8 can simultaneously use plural network softwares such as NetWare (available from Novell), UNIX (available from AT&T Bell Laboratory) and the like, in order to effectively communicate with the various kinds of host computers 4. Also, the board 8 can simultaneously use various network protocols such as TCP/IP (Transmission Control Protocol/Internet Protocol), IPX/SPX (Internet Packet eXchange/Sequential Packet Protocol) and the like to be used in these network softwares.

The scanner control body unit 11 concretely includes a communication control unit 12 which performs communication control to the host computer 4 and the like through the scanner network board 8, a scanner engine 13 which performs image data reading processing, a DKC (disk controller) 14 which controls the external storage device 10, a RAM (random access memory) for the scanner (referred as scanner RAM hereinafter) 15 which is used as working areas such as an input image information conversion area, an environment data storage area and the like, a ROM (read-only memory) for the scanner (referred as scanner ROM hereinafter) 16 which includes a program ROM 16a storing therein a predetermined control program and a data ROM 16b storing therein predetermined device setting information, and a CPU (central processing unit) for the scanner (referred as scanner CPU hereinafter) 17 which is connected to the above components through a system bus 17 and thus controls the device as a whole.

It should be noted that the external storage device 10 is connected as an option, and the scanner RAM 15 is expansible through a not-shown expansion port to expand its memory capacity.

Figure 3:
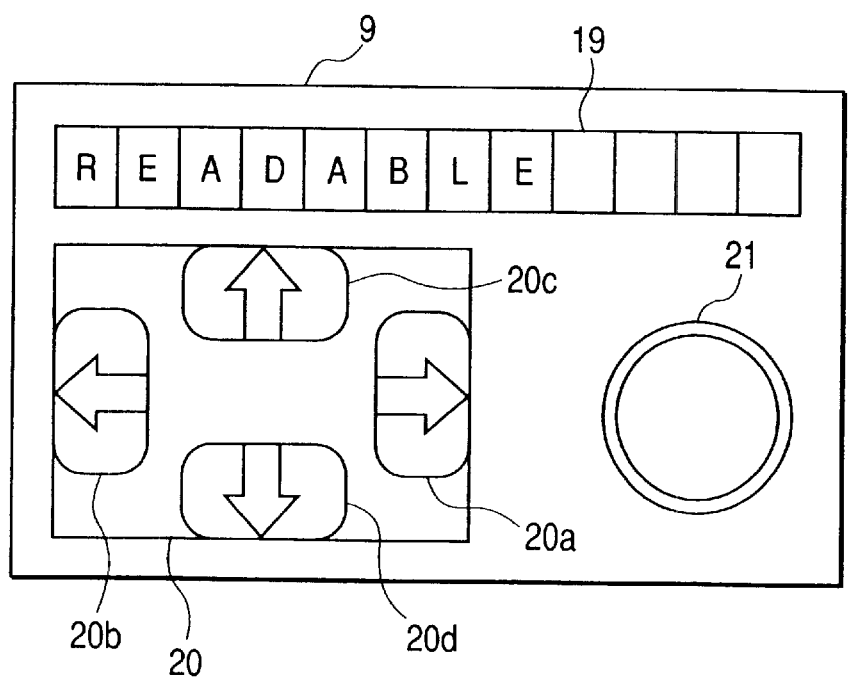
FIG. 3 is a plan view showing a console panel of the image scanner.

FIG. 3 is a plan view showing an initial state of the console panel 9 of the image scanner 1. The panel 9 includes a liquid crystal panel 19 which can display a 12-column character string, a selection key 20 which is used to select various functions of the scanner 1, and an execution key 21 which is used to instruct a start of image data reading.

The selection key 20 further includes a rightward key 20a, a leftward key 20b, an upward key 20c and a downward key 20d. In the present embodiment, by handling the rightward key 20a, it is possible to display a selected virtual output device on the liquid crystal panel 19, as described later.

Figure 4:
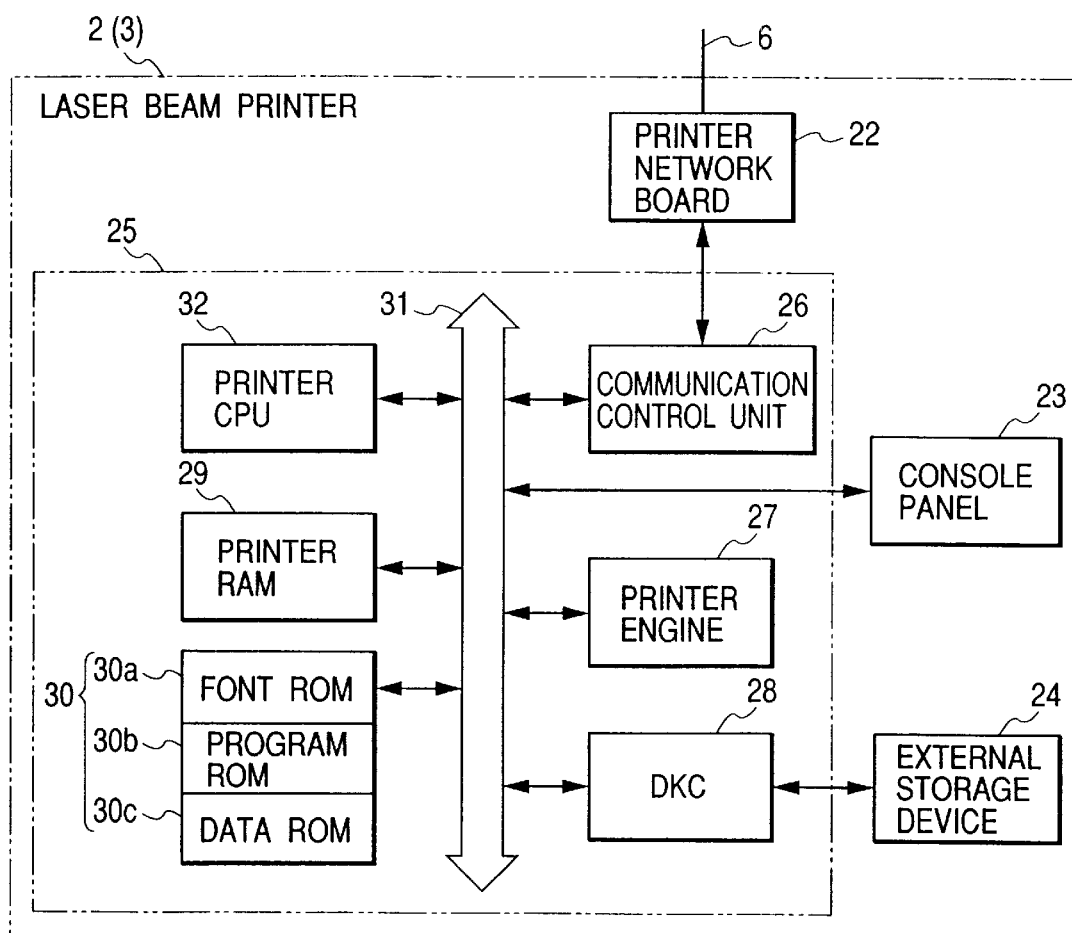
FIG. 4 is a block diagram showing the details of a laser beam printer acting as an output device.

FIG. 4 is a block diagram showing the details of the laser beam printer (i.e., first or second laser beam printer 2 or 3). That is, each of the printers 2 and 3 is composed of a printer network board 22 which is connected to the LAN 6, a console panel 23 which includes various switches, a liquid crystal panel and the like, an external storage device 24 such as a hard disk, an IC card or the like, and a printer control body unit 25 which is connected to the board 22, the panel 23 and the device 24.

Like the above scanner network board 8, also the printer network board 22 can simultaneously use the plural network softwares in order to effectively communicate with the various kinds of host computers 4, and can simultaneously use the various network protocols to be used in these network softwares.

The printer control body unit 25 concretely includes a communication control unit 26 which performs communication control to the host computer 4 and the like through the printer network board 22, a printer engine 27 which performs image data output processing, a DKC 28 which controls the external storage device 24, a RAM for the printer (referred as printer RAM hereinafter) 29 which is used as working areas such as an output image information conversion area, an environment data storage area and the like, a ROM for the printer (referred as printer ROM hereinafter) 30 which stores therein predetermined information, and a CPU for the printer (referred as printer CPU hereinafter) 32 which is connected to the above components through a system bus 31 and thus controls the device as a whole.

The printer ROM 30 includes a font ROM 30a storing therein font data or the like to be used when output information is generated to the printer engine 27, a program ROM 30b storing therein a predetermined control program and a data ROM 30c storing therein various information to be used in the host computer if necessary.

It should be noted that the printer RAM 29 is expansible through a not-shown expansion port to expand its memory capacity, and the plural external storage devices 24 are connectable to the unit 25. That is, in addition to the built-in font ROM, an optional font card and the plural external storage devices 24 respectively storing therein plural emulation programs are connectable to the unit 25. Further, it may be structured that the external storage device 24 has an NVRAM (non-volatile RAM) to store printer setting information from the console panel 23.

Figure 5:
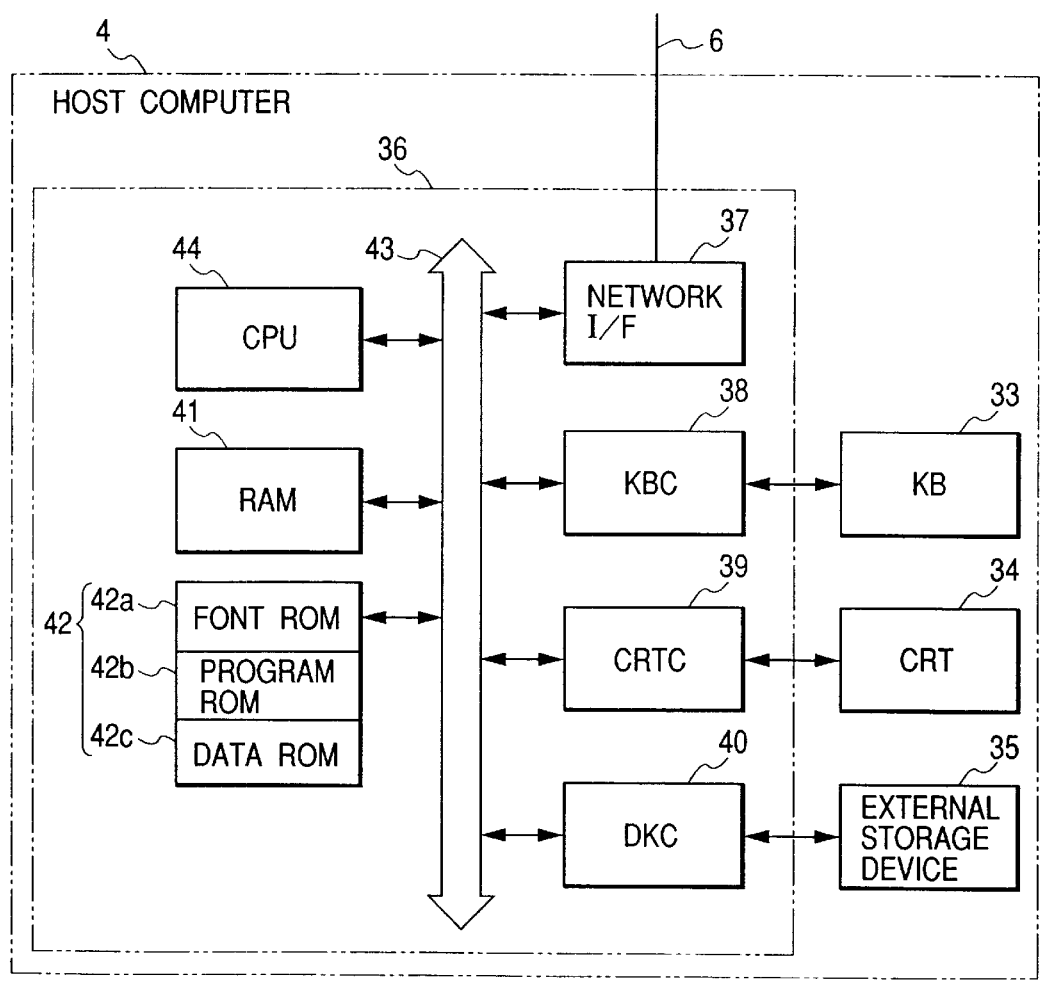
FIG. 5 is a block diagram showing the details of a host computer acting as an information processing device.

FIG. 5 is a block diagram showing the details of the host computer 4. The host computer 4 is composed of a KB (keyboard) 33 by which the user arbitrarily inputs predetermined information, a CRT (cathode ray tube: display unit) 34 which displays the predetermined information, an external storage device 35 such as a flexible disk, a hard disk or the like which stores therein a boot program, various application programs, font data, a user file, an edit file and the like, and an information processing body unit 36 which is connected to the KB 33, the CRT 34 and the external storage device 35.

Under the control of a network operating system, the host computer 4 can communicate with the image scanner 1 and the laser beam printers 2 and 3 through the scanner network board 8 and the printer network board 22, respectively.

Concretely, the information processing body unit 36 is composed of a network I/F (interface) 37 which interfaces with the LAN 6, a KBC (keyboard controller) 38 which controls key input information from the KB 33 and input information instructed by a not-shown pointing device, a CRTC (CRT controller) 39 which controls the CRT 34, a DKC (disk controller) 40 which controls accessing to the external storage device 35, a RAM 41 which stores therein the input information and also acts as a working area, a ROM 42 in which predetermined information has been previously stored, and a CPU 44 which is connected to the above components through a system bus 43 and thus controls these components.

The ROM 42 includes a font ROM 42a which stores therein font data or the like to be used in the image processing, a program ROM 42b in which a predetermined control program has been stored, and a data ROM 42c in which various data to be used in the image processing have been stored. The CPU 44 processes image data in which figures, images, characters, tables (including table calculation or the like) and the like are mixed with others, by using the RAM 41 as the working area. That is, the CPU 44 performs expansion (i.e., rasterizing) processing of an outline font to a display information area provided on the RAM 41 to enable WYSIWYG (What You See Is What You Get), and then outputs and prints the displayed information on the CRT 34 as it is. Further, the CPU 44 opens various windows registered on the basis of command information instructed by the pointing device or the like, to perform various data processing.

Figure 6:
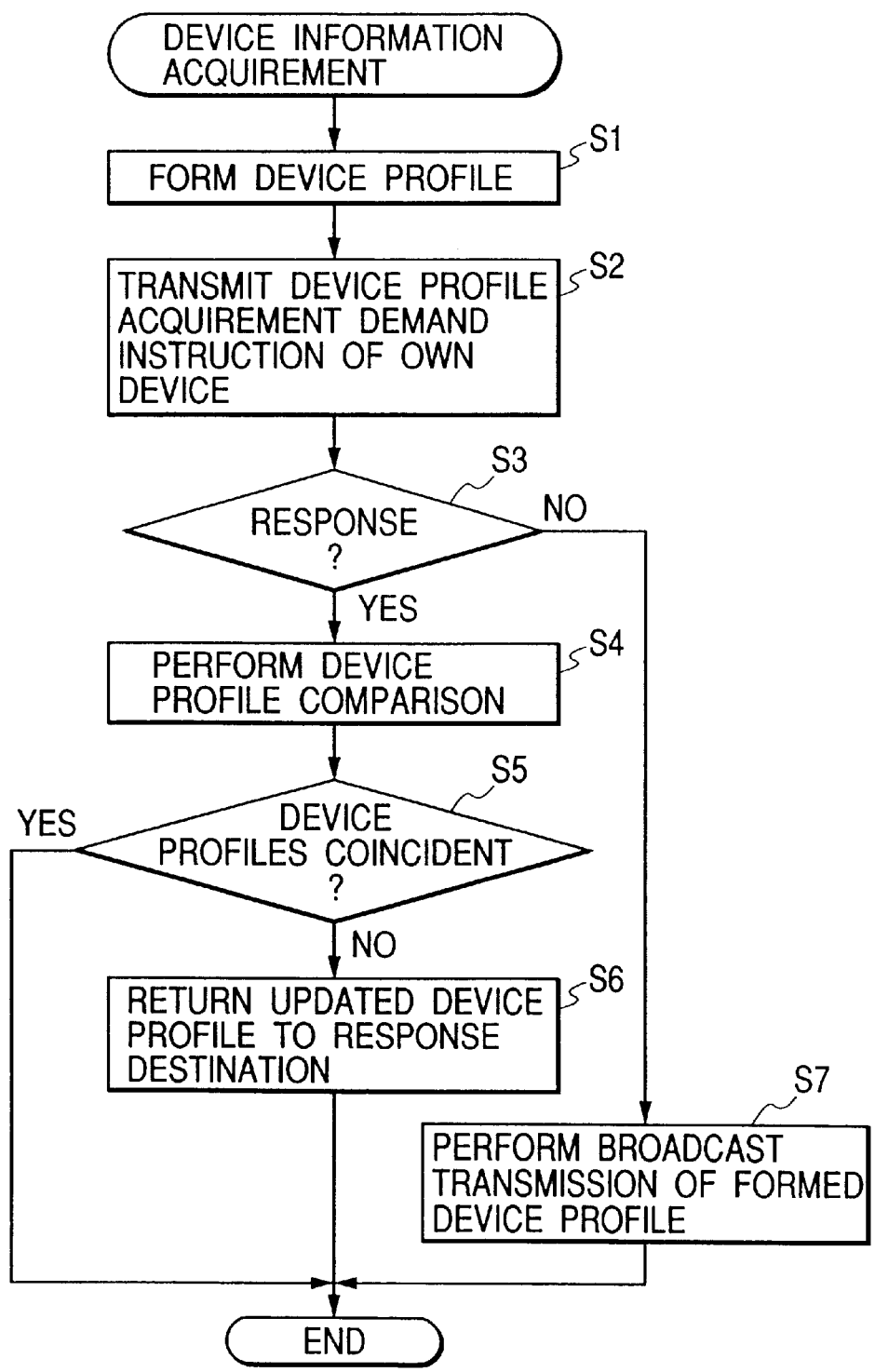
FIG. 6 is a flow chart showing a device information acquirement procedure to be executed in the image scanner.

FIG. 6 is a flow chart showing a device information acquirement procedure to acquire device information (i.e., device profile) of the image scanner 1 or the laser beam printer 2 or 3. The program for the operation in this flow chart have been stored in the program ROM 16a in the scanner ROM 16 or the program ROM 30b in the printer ROM 30, and executed by the scanner CPU 18 or the printer CPU 32, e.g., when a power supply is turned on.

In the following, although the device information acquirement procedure in the image scanner 1 will be explained with reference to the flow chart shown in FIG. 6, the device information can be acquired even in the first and second laser beam printers 2 and 3 in the same manner.

Initially, in a step S1, the device profile as shown in FIG. 7 is formed on the basis of the various data input by the handling of the console panel 9.

That is, if the user handles the console panel 9 to input a profile ID (identifier) of the device profile, a device type of own device, a device ID of own device, a network address of own device, a transfer protocol to be supported, data processing resolution (i.e., dots per inch: dpi), a paper size (or sheet size) to be supported and a data format, the device profile is formed on the basis of these data. For example, the user inputs "#1" as the profile ID, "INPUT DEVICE/IMAGE SCANNER" as the device type and "SCAN 5" as the device ID. Further, the user sequentially inputs various data as shown in FIG. 7 to form the device profile. The formed device profile is temporarily stored in the scanner RAM 18.

Subsequently, in a step S2, in order to confirm the device profile previously set when the device information was changed, the device profile acquisition instruction of own device (i.e., image scanner 1) is transmitted to the file server 5. In a subsequent step S3, it is judged whether or not the server 5 responds to the instruction. If judged that the server 5 responds to the instruction, the flow advances to a step S4 to compare the device profile received from the file server 5 with the device profile temporarily formed in the step S1 and stored in the scanner RAM 18.

Subsequently, it is judged in a step S5 whether or not these two device profiles are coincident with each other. If judged that these profiles are coincident, then it is judged that the device profile does not change, and thus the processing ends. On the other hand, if judged that these profiles are not coincident, then it is judged that the contents of the device profile changed, and the flow advances to a step S6. In this step, the device profile stored in the scanner RAM 18 in the step S1 and updated is returned to the file server 5 being the response destination through the communication control unit 12, and the processing ends. The file server 5 which received the device profile writes it into the recording device 7.

On the other hand, if judged in the step S3 that the server 5 does not respond to the instruction in a certain standby time, the flow advances to a step S7. In this step, the device profile formed in the step S1 is directly broadcasted or transmitted to the respective devices connected to the LAN 6 as new device profile information, and the processing ends.

Thus, as later described, the input and output devices (i.e., scanner and printer) are selected on the basis of the device profile (i.e., device information) stored in the file server 5 or the device profile directly transferred from the image scanner 1.

Figure 8:
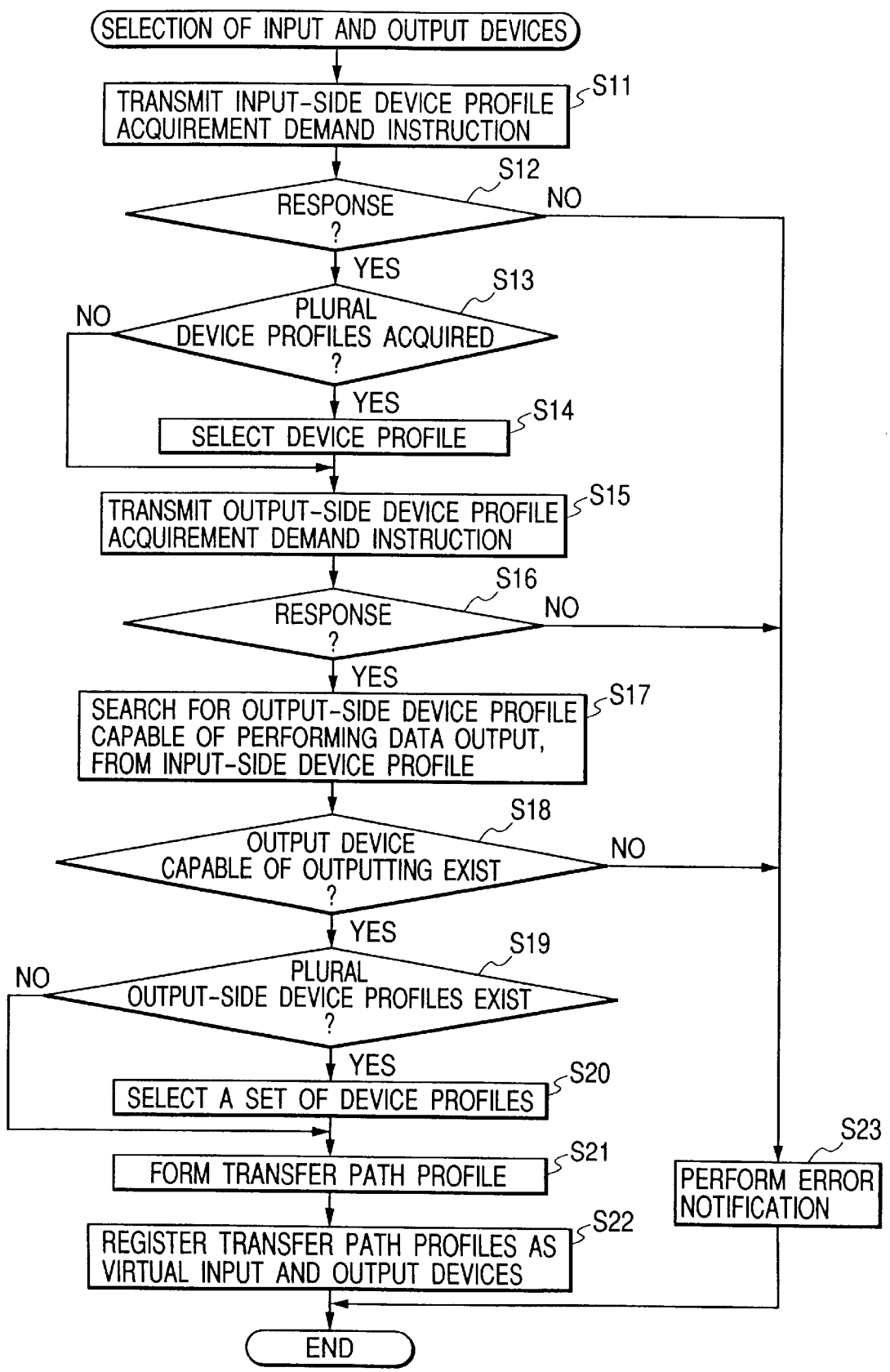
FIG. 8 is a flow chart showing an input/output device selection procedure executed in a host computer, for virtually selecting the input and output devices.

FIG. 8 is a flow chart showing an input/output device selection procedure in which the input and output devices for a copying operation are virtually selected. The program for the operation in this flow chart have been stored in the program ROM 42a in the host computer 4 and executed by the CPU 44. In the present embodiment, it will be explained a case where the device profiles of the input and output devices are acquired from the file server 5.

In the host computer 4, if the data input is performed by the user, an input-side device profile acquirement demand instruction to demand to acquire the device profile of the input device is transmitted to the file server 5 through the LAN 6 in a step S11. Then it is judged in a step S12 whether or not the file server 5 responds to the instruction in a certain time. If judged that the server 5 responds, then it is judged in a subsequent step S13 whether or not the plural input-side device profiles are acquired. If the number of the acquired device profile is one, the flow advances to a step S15. On the other hand, if the plural input-side device profiles are acquired, the flow advances to a step S14. In this step, the user handles the keyboard 33 to select one input-side device profile (e.g., device profile having device ID "SCAN 5" shown in FIG. 7) from among the plural input-side device profiles, and the flow advances to the step S15.

Subsequently, in the step S15, an output-side device profile acquirement demand instruction to demand to acquire the device profile of the output device is transmitted to the file server 5 through the LAN 6. Then it is judged in a step S16 whether or not the file server 5 responds to the instruction in a certain time. If judged that the server 5 responds, the flow advances to a subsequent step S17 to search for the output-side device profile capable of performing data output in the acquired output-side device profiles, on the basis of the contents of the acquired input-side device profile. That is, it is judged whether or not the output device which has the output-side device profile of which transfer protocol and data format are coincident with those of the input-side device profile exists.

Then it is judged in a step S18 whether or not the output device capable of performing the data output exists, on the basis of the input-side and output-side device profiles. If judged that such the output device exists, then it is judged in a step S19 whether or not the plural output-side devices exist. If the number of the existing output-side device profile is one, such the output-side device profile and the previously determined input-side device profile are selected in pairs, and the flow advances to a step S21. On the other hand, if the plural output-side device profiles exist, then in a step S20 the user select such the pair of the device profiles.

Figure 9A:
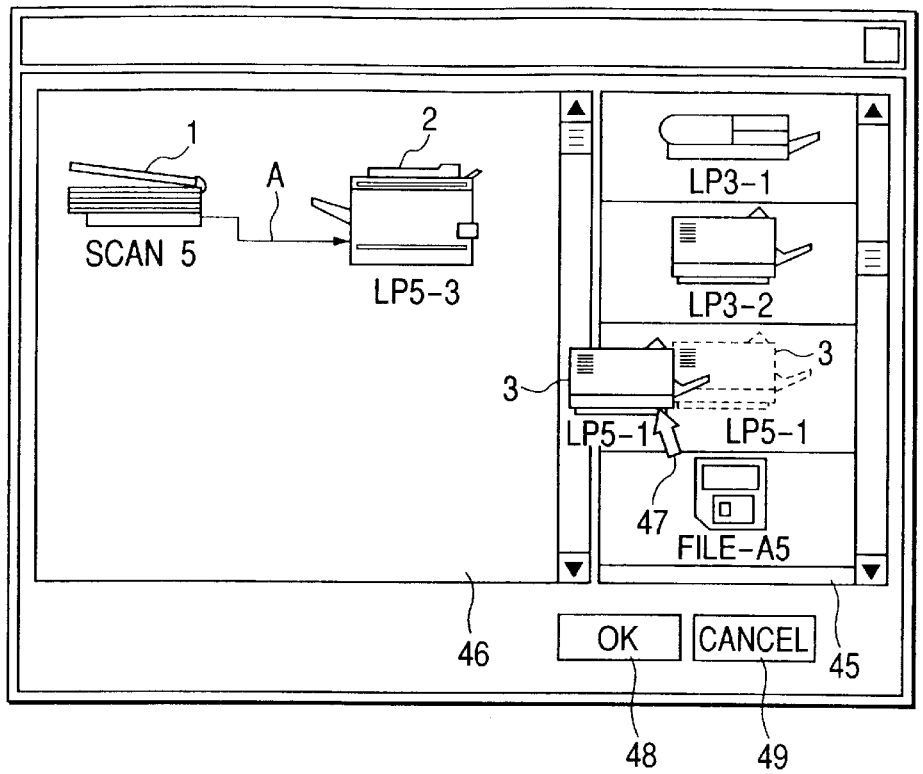
FIGS. 9A and 9B are front views showing states that the input and output devices are displayed as icons on a CRT of the host computer.
Figure 9B:
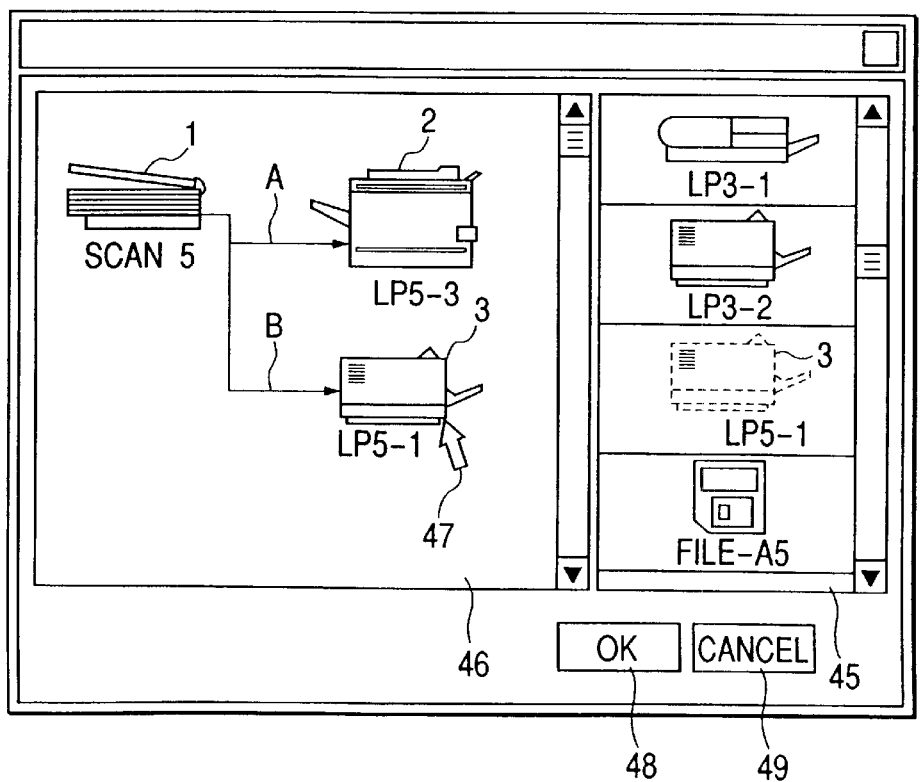

Concretely, the user handles the pointing device on the display screen of the CRT 34 by using a GUI (graphical user interface) to select the pair of the device profiles. That is, as shown in FIG. 9A, the display screen of the CRT 34 includes a first window section 45 capable of displaying the plural available output devices as icons and a second window section 46 capable of displaying a virtual connection state between the input and output devices as icons. For example, as shown by a connection line A, the section 46 displays that the image scanner 1 (device ID "SCAN 5") acting as the input device and the first laser beam printer 2 (device ID "LP5-3") acting as the output device have been already selected as the pair of the device profiles. In this case, if the user wishes to further select the second laser beam printer 3 (device ID "LP5-1") as the output-side device profile, he must drag leftward the printer 3 ("LP5-1") displayed as the icon in the first window section 45 toward a predetermined position in the second window section 46, by handling a cursor 47. Then if the icon is moved up to the predetermined position, as shown in FIG. 9B, the second window section 46 displays that the printer 3 ("LP5-1") is connected to the image scanner 1 ("SCAN 5") through a connection line B. In this state, if the cursor 47 is moved to an OK button 48 and the pointing device is clicked, the image scanner 1 ("SCAN 5") and the second laser beam printer 3 ("LP5-3") are selected as a new pair of the device profiles. Thus, it is possible to realize the state that the image scanner 1 is virtually connected to the first and second laser beam printers 2 and 3 respectively through the connection lines A and B. On the other hand, if the user could not select the desired pair of the device profiles due to handling error or the like, he must move the cursor 47 to a cancel button 49 and clicks the pointing device, whereby it is possible to cancel the above selection. Then the user repeats the above handling, whereby it is possible to select the desired pair of the device profiles.

As above, by selecting on the CRT 34 the image scanner 1 and the first and second laser beam printers 2 and 3 as the pair of the device profiles, the virtual connection state of the input and output devices is realized. Then the flow advances to the step S21 to form a transfer path profile as shown in FIG. 10.

That is, in order to cause the first and second laser beam printers 2 and 3 to output and print the image data read by the image scanner 1, after a profile ID (e.g., "#2") of the transfer path profile is written, the processing contents and the processing-tar get input and output devices (e.g., "COPY SCAN 5 TO LP5-3, LP5-1") are written at the description. Subsequently, "SCAN 5" being the device ID of the image scanner 1 (i.e., input device) is written, and then the network address of the scanner 1 and the device ID of the connection device virtually connected to the scanner 1 are written. Further, various information is written for each connection device. In the present embodiment, since the two laser beam printers 2 and 3 are selected as the output devices (i.e., device profiles), the device ID, the network address, the tray stage of the paper discharge destination, the transfer protocol name, the data processing resolution, the paper size and the data format are sequentially written. As above, the transfer path profile is formed.

In a subsequent step S22, the transfer path profile is transferred to the file server 5 and stored in the recording device 7 of the server 5 together with virtual input/output device information, and then the processing ends.

Figures 11, 13:
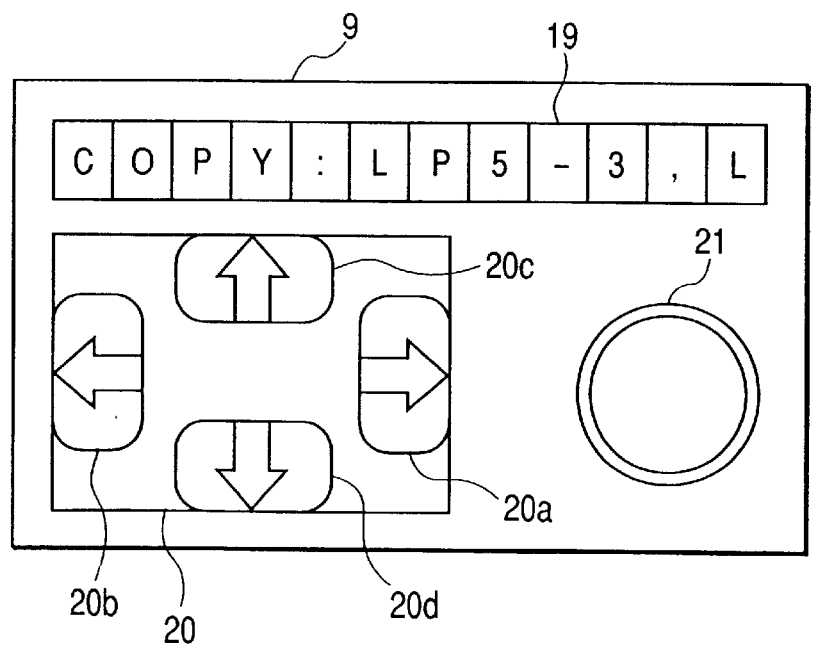
FIG. 11 is a view showing a file of virtual input/output device information stored in a recording device connected to a file server.
FIG. 13 is a plan view showing a console panel displaying a data transmission state.

Concretely, as shown in FIG. 11, the virtual input/output device information includes a virtual input/output device ID, a transfer path profile ID, a user profile ID and a comment to be displayed on the console panel 9 of the image scanner 1. These data (information) are stored in the recording device 7. In FIG. 11, symbol "XX" in the comment represents an individual name (abbreviation) to identify the user.

If judged in the step S12 or S16 that the server 5 does not respond to the instruction, or if judged in the step S18 that the available output device (i.e., output device capable of performing data output) does not exist, error notification is performed to the user (step S23), and the processing ends.

Subsequently, it will be explained an image processing method in which the image data is transmitted from the image scanner 1 to the first and second laser beam printers 2 and 3.

Figure 12:
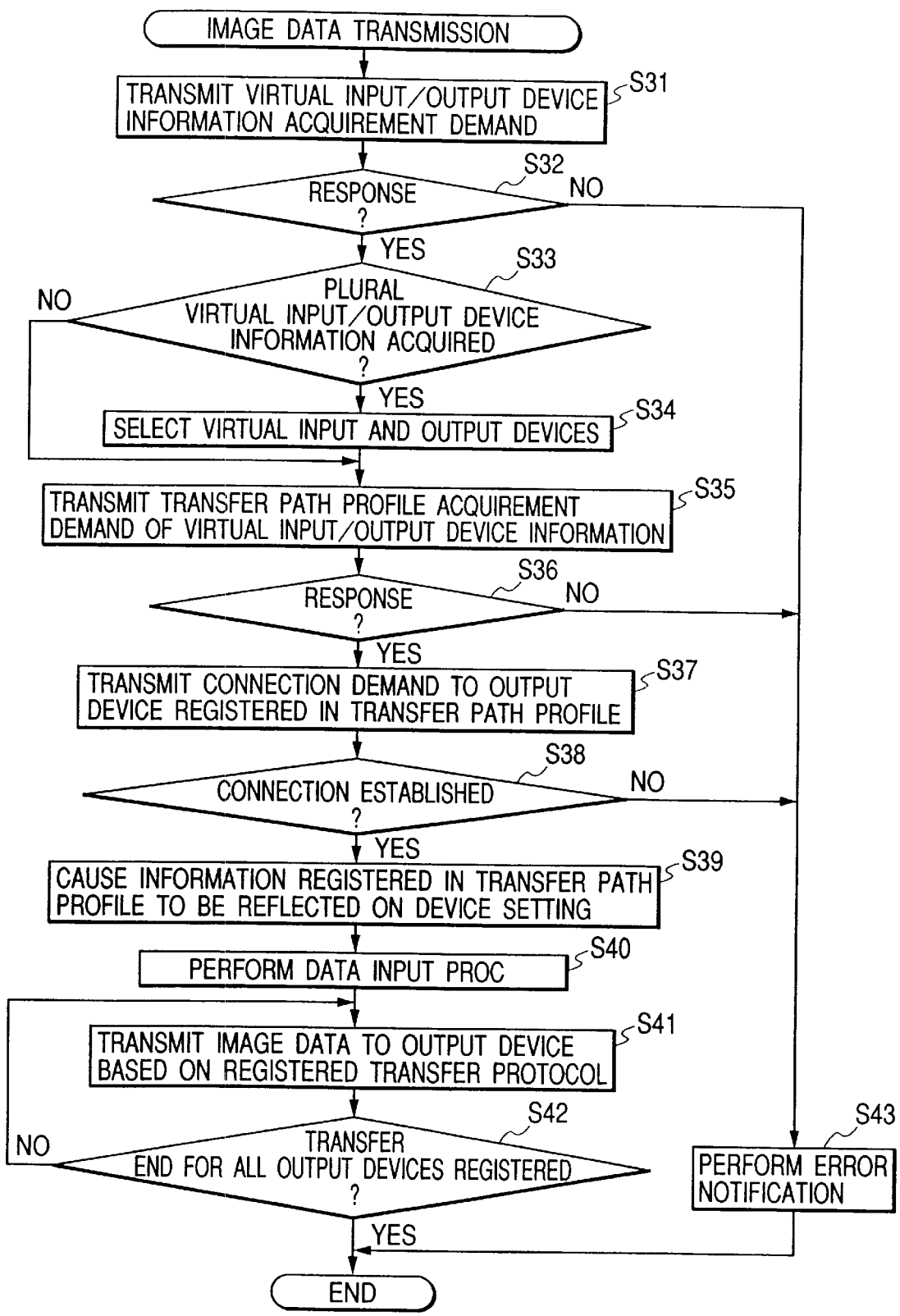
FIG. 12 is a flow chart showing an image data transmission procedure to be executed in the image scanner.

FIG. 12 is a flow chart showing an image data transmission procedure. The program for the procedure in this flow chart have been stored in the program ROM 16a in the image scanner 1, and executed by the scanner CPU 18.

If the user depresses the rightward key 20a of the selection key 20 on the console panel 9 shown in FIG. 3, the file server 5 is demanded to acquire the virtual input/output device information in a step S31. In a subsequent step S32, it is judged whether or not the file server 5 responds to the demand in a certain time. Then if judged that the file server 5 responds, the received virtual input/output device information is stored in the RAM 15, and the flow advances to a step S33 to judge whether or not the file server 5 acquired the plural virtual input/output device information. As shown in FIG. 13, the device ID's (e.g., "LP5-3" and "LP5-1") being paired with own device (i.e., image scanner 1) are displayed on a liquid crystal panel 19 of the console panel 9, and the flow advances to a step S35. On the other hand, if judged in the step S33 that there are the plural virtual input/output device information indicating the image scanner 1 as the input device, such the information is transmitted from the file server 5 and hierarchically stored in the scanner RAM 15. Then each virtual input/output device information is sequentially displayed on the liquid crystal panel 19 every time the rightward key 20a is depressed.

As above, in the case where the plural virtual input/output device information is acquired, the rightward key 20a is depressed several appropriate times until the desired virtual input/output device information is displayed on the panel 19. Thus, the specific output device information (e.g., device ID's "LP5-3" and "LP5-1") is selected, whereby it is possible to acquire the virtual input/output device information in which the pair of the input and output devices has been determined.

Subsequently, in the step S35, the file server 5 is demanded to acquire the transfer path profile corresponding to the virtual input/output device information acquired as above. Then it is judged whether or not the file server 5 responds to the demand in a certain time (step S36). If judged that the file server 5 responds, the flow advances to a step S37 to demand the output devices (e.g., first and second laser beam printers: "LP5-3" and "LP5-1") registered in the transfer path profile received from the server 5 to connect the lines. Then it is judged in a step S38 whether the line connection is established. If judged that the line connection is established, the various information (i.e., data processing resolution, paper size and data format) registered in the transfer path profile is reflected in the device setting of the image scanner 1 (step S39), and the data input processing (i.e., image reading processing) is performed (step S40). The read image data is stored in the RAM 15 or the external storage device 10.

After then, in a step S41, the image data previously stored in the RAM 15 or the external storage device is directly transferred through the LAN 6 to the output device (e.g., first laser beam printer 2) registered in the transfer path profile, in accordance with an LPD (transfer protocol) registered in the transfer path profile. In a subsequent step S42, it is judged whether or not the image data transfer to all the registered output devices ends. In this case, since the image data is not transferred yet to the second laser beam printer 3, the judged result "NO" is obtained in the step S42, and thus the processing in the step S41 is repeated such that the same transfer procedure as to the first laser beam printer 2 is executed also to the second laser beam printer 3. After then, when the judged result "YES" is obtained in the step S42, the image data transmission processing ends.

If judged in the step S32 or S36 that the server 5 does not send the response, or if judged in the step S38 that the line connection could not be established, error notification is performed to the user (step S43), and the processing ends.

In the transmission procedure as above, it is possible to directly transfer the image data from the image scanner 1 to the first and second laser beam printers 2 and 3 without passing the data through the host computer 4 when the data is transferred. Therefore, since it is unnecessary for the host computer 4 to temporarily store the numerous image data, it is unnecessary to install a high-performance CPU, a large-capacity memory or a high-speed accessible memory in the host computer. Thus, it is possible to perform the high-speed processing of the image data at low cost.

Further, in the present embodiment, by only selecting the virtual input/output device information with use of the GUI of the host computer previously, it is possible to systemize and use the multifunction obtained by flexibly composing the input device and the plural output devices. Thus, it is unnecessary to provide a high-resolution liquid crystal panel and a console panel including numerous keys in the input device (e.g., image scanner), whereby it is possible to easily realize the high-performance multifunctional system by only providing the simple console panel.

Figure 14:
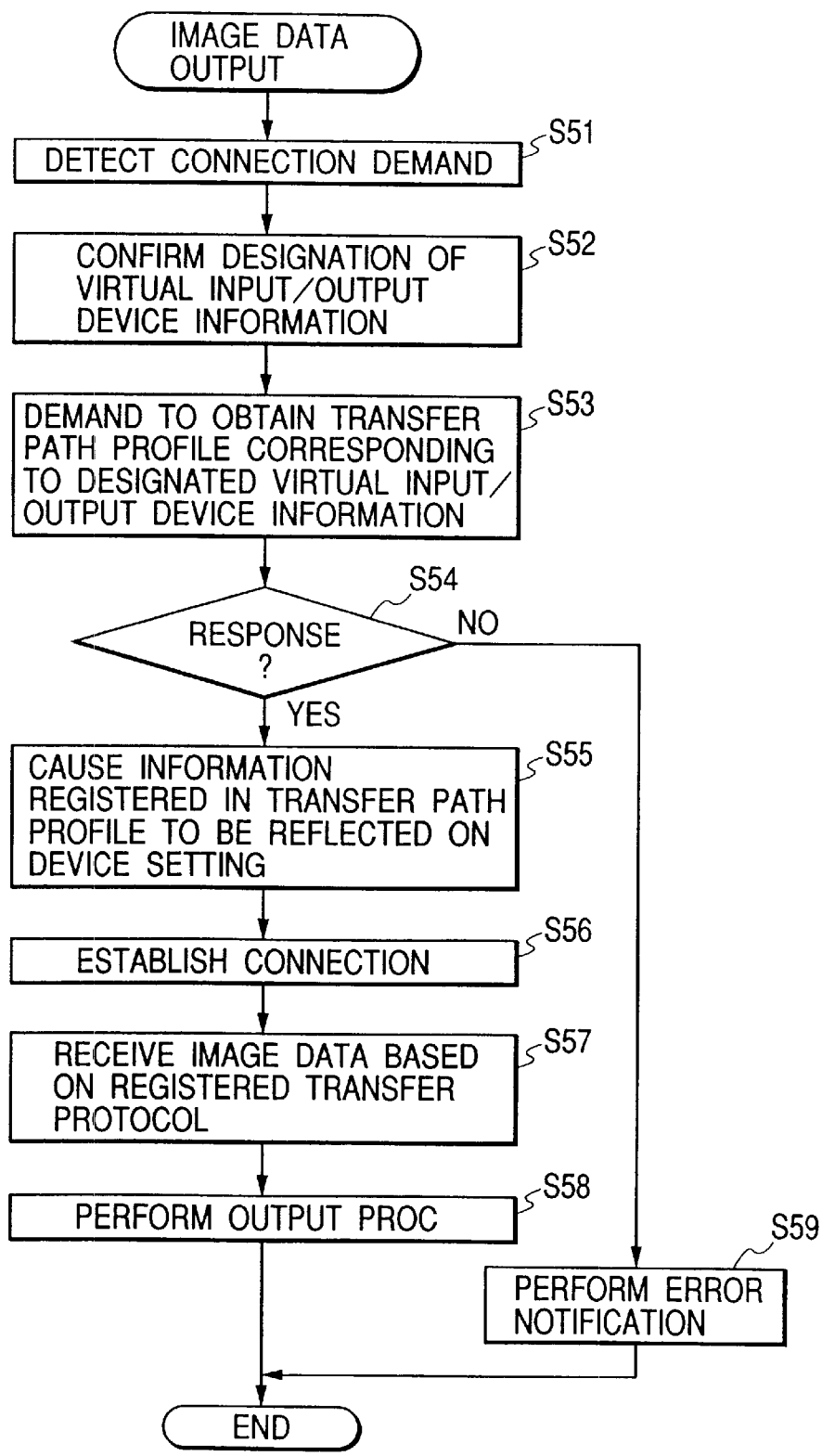
FIG. 14 is a flow chart showing an image data output procedure to be executed in the laser beam printer.

FIG. 14 is a flow chart showing an image data output procedure to be executed in the first laser beam printer 2. The program for the procedure in this flow chart have been previously stored in the program ROM 30b in the first laser beam printer 2, and executed by the printer CPU 32. In the present embodiment, a case where the image data is output by the first laser beam printer 2 will be explained. However, the present embodiment is similarly applicable to a case where the image data is output by the second laser beam printer 3.

Initially, in a step S51, a line connection demand from the image scanner 1 is detected. Then it is confirmed in a subsequent step S52 whether or not the first laser beam printer 2 has been designated as the output device of the image scanner 1, on the basis of the virtual input/output device information. In a subsequent step S53, the file server 5 is demanded to acquire the transfer path profile corresponding to the virtual input/output device information. Then it is judged in a step S54 whether or not the file server 5 responds to the demand in a certain time. If judged that the server 5 responds, the various information (i.e., data processing resolution, paper size and data format) registered in the transfer path profile received from the file server 5 is reflected in the device setting of the first laser beam printer 2 (step S55). Then the line connection is established between the printer 2 and the image scanner 1 which issued the line connection demand (step S56), and in a subsequent step S57 the image data directly transferred from the image scanner 1 through the LAN 6 is received from the registered LPD (transfer protocol). Then in a step S58 the printing output processing is executed, and the processing ends.

On the other hand, if judged in the step S54 that the file server 5 does not respond to the demand, error notification is performed to the user (step S59), and the processing ends.

As above, in the first embodiment, the first laser beam printer 2 can perform the desirable device setting by receiving the virtual input/output device information prior to the image data reception. Therefore, it is possible to reduce a load of control at the time when the image scanner 1 controls the operation of the first laser beam printer 2, thereby increasing the performance of the image scanner 1 and decreasing an entire cost.

It should be noted that the present invention is not limited to the present embodiment. That is, although the device profile is acquired from the file server 5 in the present embodiment, it is possible to transmit the device profile as a broadcast message from the input and output devices to other devices through the LAN 6. Further, although the virtual input/output device information and the transfer path profile are also acquired from the file server 5 in the present embodiment, it is possible to temporarily store the virtual input/output device information and the transfer path profile into the memory of the host computer 4 and then issue notification from the computer 4 to the laser beam printers 2 and 3 when the acquirement is demanded from the printers 2 and 3. Further, it is possible to previously store the virtual input/output device information, the transfer path profile and the device profile into the input or output device. Thus, it is possible to omit the file server 5, thereby further decreasing the entire cost.

Further, in the present embodiment, the output data is sequentially transferred by performing "unicast" communication plural times in the steps S41 and S42 (FIG. 12). However, if it is possible to perform "multicast" communication to simultaneously communicate with a group including plural nodes in the network, it is desirable to simultaneously perform the data transfer to the plural laser beam printers included in the desired transfer path profile by the multicast communication.

Further, the present embodiment has been explained as to the two laser beam printers (i.e., first and second laser beam printers 2 and 3) as the output devices. However, if the plural output devices (other than printer) such as an image filing device, a facsimile device and the like are described in the transfer path profile, the present invention is applicable to the system in which the plural different-function output devices are combined with the input device.

As described above in detail, in case of transferring the data, it is possible to directly perform the data transfer from the input device to the plural output devices without using any information processing device. Therefore, since it is unnecessary for the information processing device to temporarily store the large-quantity data, it is unnecessary to install a high-performance CPU, a large-capacity memory or a high-speed accessible memory in the information processing device, thereby performing the high-speed image data processing at low cost.

Further, since the pair of the input and output devices is selected by using the GUI, it is possible to easily systemize and use the multifunction obtained by flexibly composing the input device and the plural output devices. Thus, by selecting the virtual input/output device information with use of the GUI, it is unnecessary to provide a high-resolution liquid crystal panel and a console panel including numerous keys in the input or output device, thereby easily realizing the high-performance multifunctional system by providing only a simple console panel.

Further, in the output device, it is possible to perform the desirable device setting by receiving the virtual input/output device information prior to the image data reception. Therefore, since it is possible to reduce a load of control at the time when the input device controls the operation of the output device, thereby increasing the performance of the input device and decreasing an entire cost.

(Second Embodiment)

Hereinafter, the second embodiment of the present invention will be explained with reference to the annexed drawings.

<Structural Example of Multifunctional System>

Figure 15:
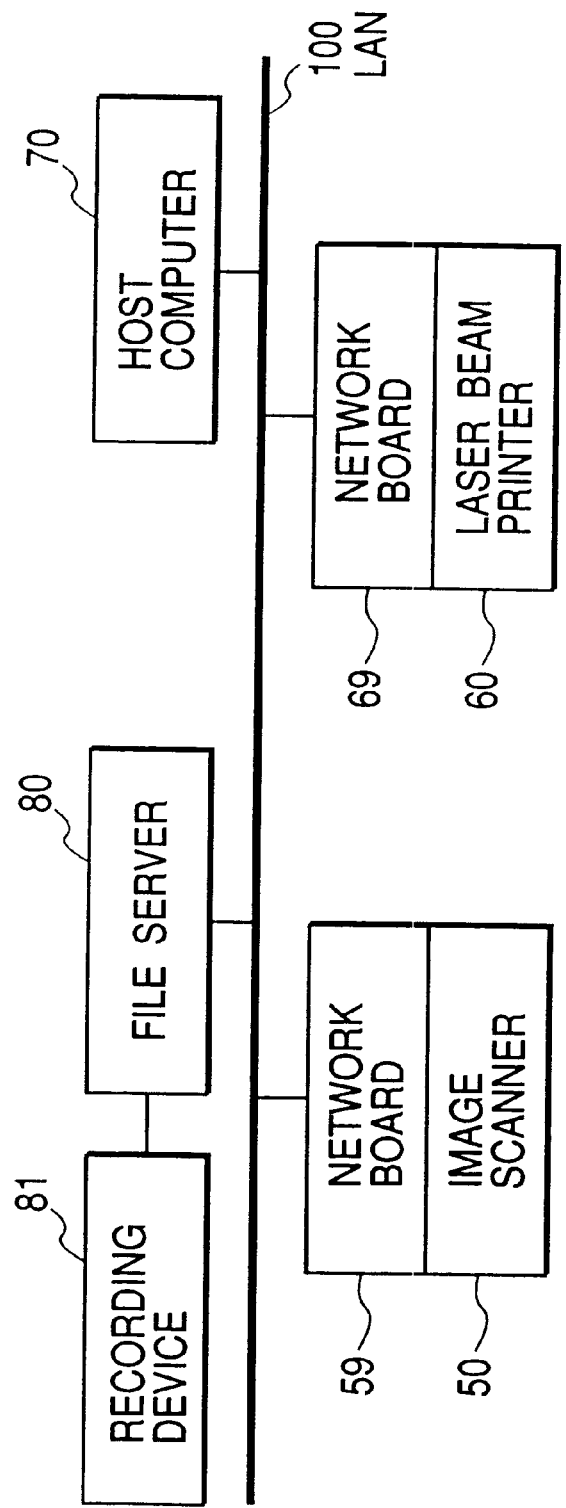
FIG. 15 is a block diagram showing a structural example of a network constituting a multifunctional system according to the second embodiment of the present invention.

FIG. 15 shows an example of a standard structure of a network constituting a multifunctional system. In this system, a network board 59 for connecting an image scanner to the network and a network board 69 for connecting a laser beam printer to the network are equipped. It should be noted that the number of the image scanners and the laser beam printers connected to the network is not limited to that shown in FIG. 15.

In FIG. 15, the network boards 59 and 69 are connected to a LAN 100 through a not-shown LAN interface such as an Ethernet interface (e.g., 10BASE-2) having a coaxial cable, a 10BASE-T having an RJ45 or the like. Further, plural host computers such as a host computer 70 and the like are also connected to the LAN 100, and such the computer 70 can communicate with the network boards 59 and 69 under the control of a network operating system. Further, a file server 80 is connected to the LAN 100 to manage accessing to files stored in a recording device 81 such as a hard disk or the like.

More concretely, in order to effectively communicate with the various host computers, the network boards 59 and 69 can simultaneously use plural network softwares such as NetWare (available from Novell), UNIX (available from AT&T Bell Laboratory) and the like. Also, the boards 59 and 69 can simultaneously use various network protocols such as TCP/IP, IPX/SPX and the like to be used in these network softwares.

Briefly, the file server 80 acts as a file management unit which performs data transmission/reception to/from the host computer 70, shares the data with the computer 70, stores the data and performs queuing (i.e., data storage in processing queue) of the data to be transmitted to a print server. For example, the data file group formed by the host computer 70 is transmitted to the file server 80, and the server 80 performs the queuing of the received data and then transmits the data file group subjected to the queuing to a laser beam printer 60 through the network board 69, thereby performing print processing. Alternatively, the data file group formed by the host computer 70 can be directly transmitted to the laser beam printer 60 by the computer 70 itself through the network board 69 to perform the print processing.

Subsequently, the structures of the image scanner being the input device and the laser beam printer being the output device to which the present embodiment can be suitably applied will be explained with reference to FIGS. 15 to 18. It should be noted that the present embodiment is applicable not only to the image scanner and the laser beam printer, but also to other-type devices such as a fax machine, a digital camera and the like.

<Structural Example of Image Scanner>

Figure 16:
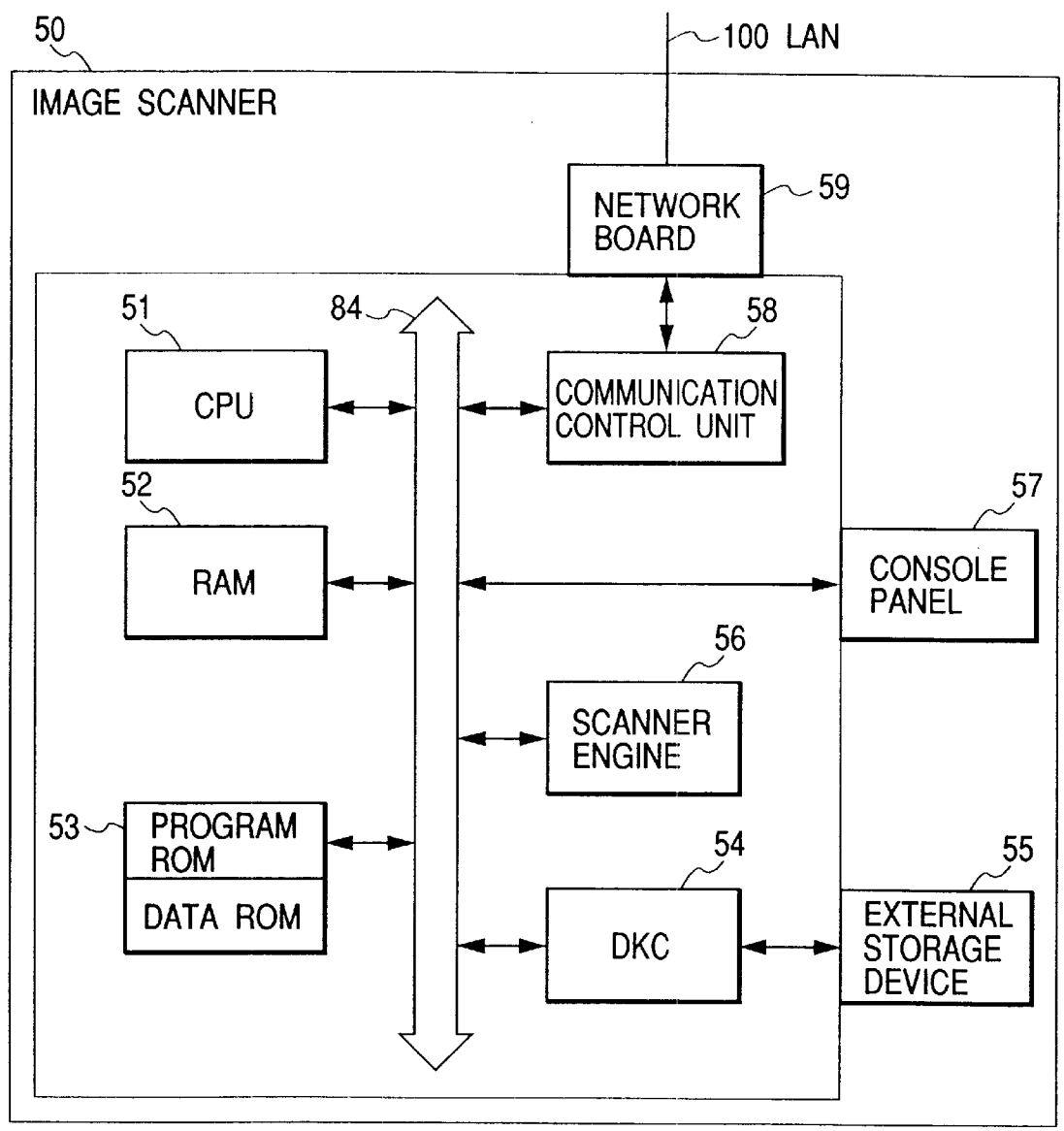
FIG. 16 is a block diagram showing a structural example of a control system of an image scanner.

FIG. 16 is a block diagram showing a control system structure of the input device in the present embodiment. In FIG. 16, the image scanner will be explained by way of example.

In an image scanner 50, a CPU 51 is the processor which performs various calculation and controlling. That is, on the basis of a control program or the like stored in a program ROM of a ROM 53 or a control program or the like stored in an external storage device 55 and loaded into a RAM 52, the CPU 51 controls accessing to various devices connected to a system bus 84 as a whole, and inputs an image signal as input information from a scanner engine 56.

The program ROM of the ROM 53 stores therein such the control program of the CPU 51 as executing the processing shown in the flow charts of FIGS. 19 to 22. In a case where the image scanner does not include the external storage device 55, the data ROM of the ROM 53 stores therein setting information and the like of devices such as an HD (hard disk), an NVRAM and the like. A communication control unit 58 can control communication processing to external devices such as a host computer and the like through the network board 59 under the control of the CPU 51, whereby the information in the image scanner can be notified to the host computer and the like.

The RAM 52 acts as a main memory and a working area for the CPU 51, and of which capacity is extensible by an optional RAM connected to a not-shown expansion port. Concretely, the RAM 52 is used as an input image information conversion area, an environmental data storage area, or a program loading area into which the program is loaded from the external storage device 55. The accessing to the above external storage device such as the HD, an IC card or the like is controlled by a DKC (disk controller) 54. The external storage unit 55 is optionally connected to store input image information, the image conversion program and the like. Numeral 57 denotes a console panel on which operation switches, an LED (light emitting diode) display and the like are arranged.

It should be noted that it is possible to structure an another-type input device by making the scanner engine 56 to correspond to other functions such as a digital camera and the like.

<Structural Example of Laser Beam Printer>

Figure 17:
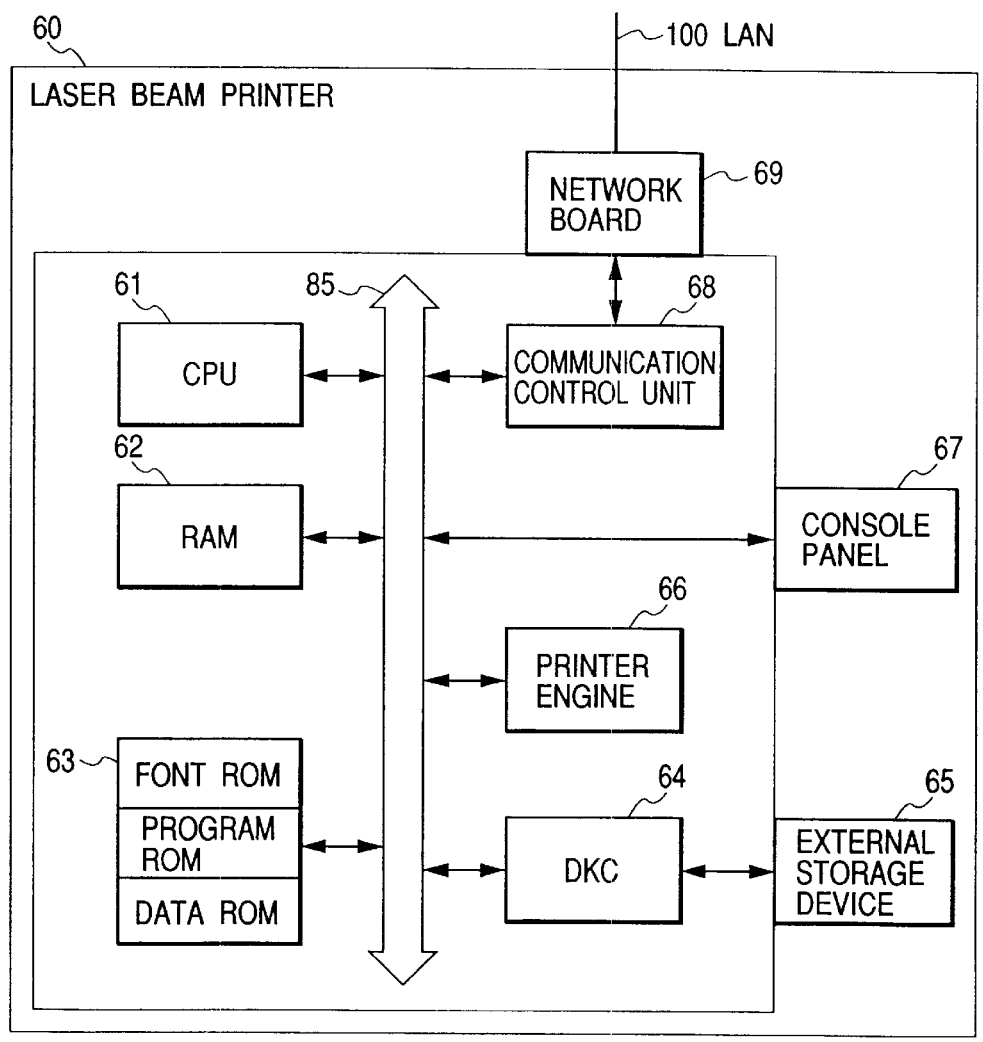
FIG. 17 is a block diagram showing a structural example of a control system of a laser beam printer.

FIG. 17 is a block diagram showing a structure of a control system of the output device in the present embodiment. In FIG. 17, the laser beam printer will be explained by way of example.

In the laser beam printer 60, a CPU 61 is the processor which performs various calculation and controlling. That is, on the basis of a control program or the like stored in a program ROM of a ROM 63 or a control program or the like stored in an external storage device 65 and loaded into a RAM 62, the CPU 61 controls accessing to various devices connected to a system bus 85 as a whole, and outputs an image signal as output information to a printer engine 66.

The program ROM of the ROM 63 stores therein such the control program of the CPU 61 as executing the processing shown in the flow charts of FIGS. 19 to 22. In a case where the printer does not include the external storage device 65 such as an HD, a data ROM of the ROM 63 stores therein setting information and the like of the devices. A communication control unit 68 can control communication processing to external devices such as a host computer and the like through the network board 69 under the control of the CPU 61, whereby the information in the printer can be notified to the host computer and the like.

Numeral 62 denotes the RAM which acts as a main memory and a working area for the CPU 61, and of which capacity is extensible by an optional RAM connected to a not-shown expansion port. Concretely, the RAM 62 is used as an input image information expansion area, an environmental data storage area, or a program loading area into which the program is loaded from an NVRAM or the external storage device 65.

The accessing to the above external storage device 65 such as the HD, an IC card or the like is controlled by a DKC 54. The external storage unit 65 is optionally connected to store font data, an emulation program, form data and the like. Numeral 67 denotes a console panel on which operation switches, an LED display and the like are arranged. It should be noted that the number of the external storage device is not limited to one. That is, at least one or more external storage devices 65 can be connected in order to respectively store an optional font card, a program to interpret different-system printer control language and the like, in addition to the built-in font. Further, a not-shown NVRAM can be provided to store printer mode setting information sent from the console panel 67.

It should be noted that it is possible to structure an another-type input device by making the printer engine 66 to correspond to other functions such as a fax machine and the like.

<Structural Example of Host Computer>

Figure 18:
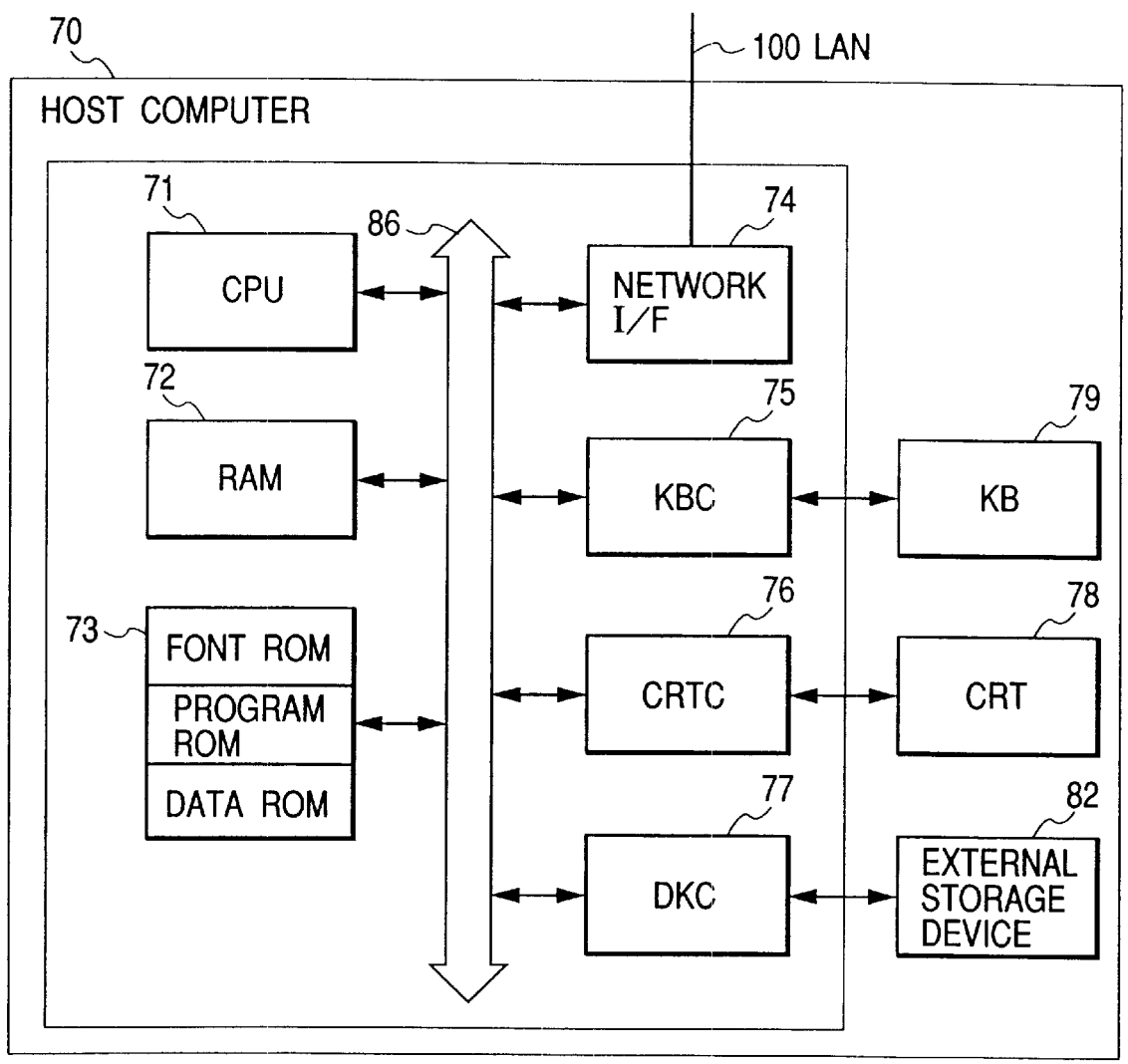
FIG. 18 is a block diagram showing a structural example of a control system of a host computer.

FIG. 18 is a block diagram for explaining the control system structure of the host computer by which the control program according to the present embodiment is executed.

The host computer 70 includes a CPU 71 which is used for various calculation and controlling. That is, on the basis of a word processing program or the like stored in a program ROM of a ROM 73 or loaded from an external storage device 82 into a RAM 72, the CPU 71 processes a document in which figures, images, characters, tables (including table calculation or the like) and the like are mixed with others. Further, the respective devices connected to a system bus 86 are entirely controlled by the CPU 71.

The program ROM of the ROM 73 stores therein such the control programs for the CPU 71 as shown in the flow charts of FIGS. 19 to 22, a font ROM of the ROM 73 stores therein font data and the like used in the word processing, and a data ROM of the ROM 73 stores therein various data (e.g., initial value of printing information, error message and the like) used in the word processing. Numeral 72 denotes a RAM which acts as a main memory and a working area for the CPU 71, or acts as a program loading area and the like.

Numeral 75 denotes a KBC (keyboard controller) which controls key inputting from a KB 79 or a not-shown pointing device. Numeral 76 denotes a CRTC (CRT controller) which controls displaying of a CRT 78. Numeral 77 denotes a DKC (disk controller) which controls accessing to the external storage device 82 such as an HD, an FD (floppy disk) or the like for storing a boot program, various application programs, font data, a user file, an edit file and the like. Numeral 74 denotes a network I/F which is connected to the input device (e.g., image scanner 50) and the output device (e.g., laser beam printer 60) through the network to execute communication control processing to each of the input and output devices. In FIG. 18, it should be noted that a network device (e.g., LAN) and other external devices are not shown.

The CPU 71 performs expansion (i.e., rasterizing) processing of an outline font to, e.g., a display information area provided on the RAM 72 to enable WYSIWYG (What You See Is What You Get). In the WYSIWYG, the final outputting form can be confirmed on the display unit at any time, the data can be displayed on the display unit according to the user's wishes, and the displayed data can be output by the output device as it is. Further, the CPU 71 opens various windows registered based on commands instructed by a not-shown mouse cursor or the like on the CRT 78, to perform various data processing.

<Operational Example of Multifunctional System>

In the multifunctional system structured as above, the present embodiment will be described with reference to the flow charts shown in FIGS. 19 to 22.

Figure 19:
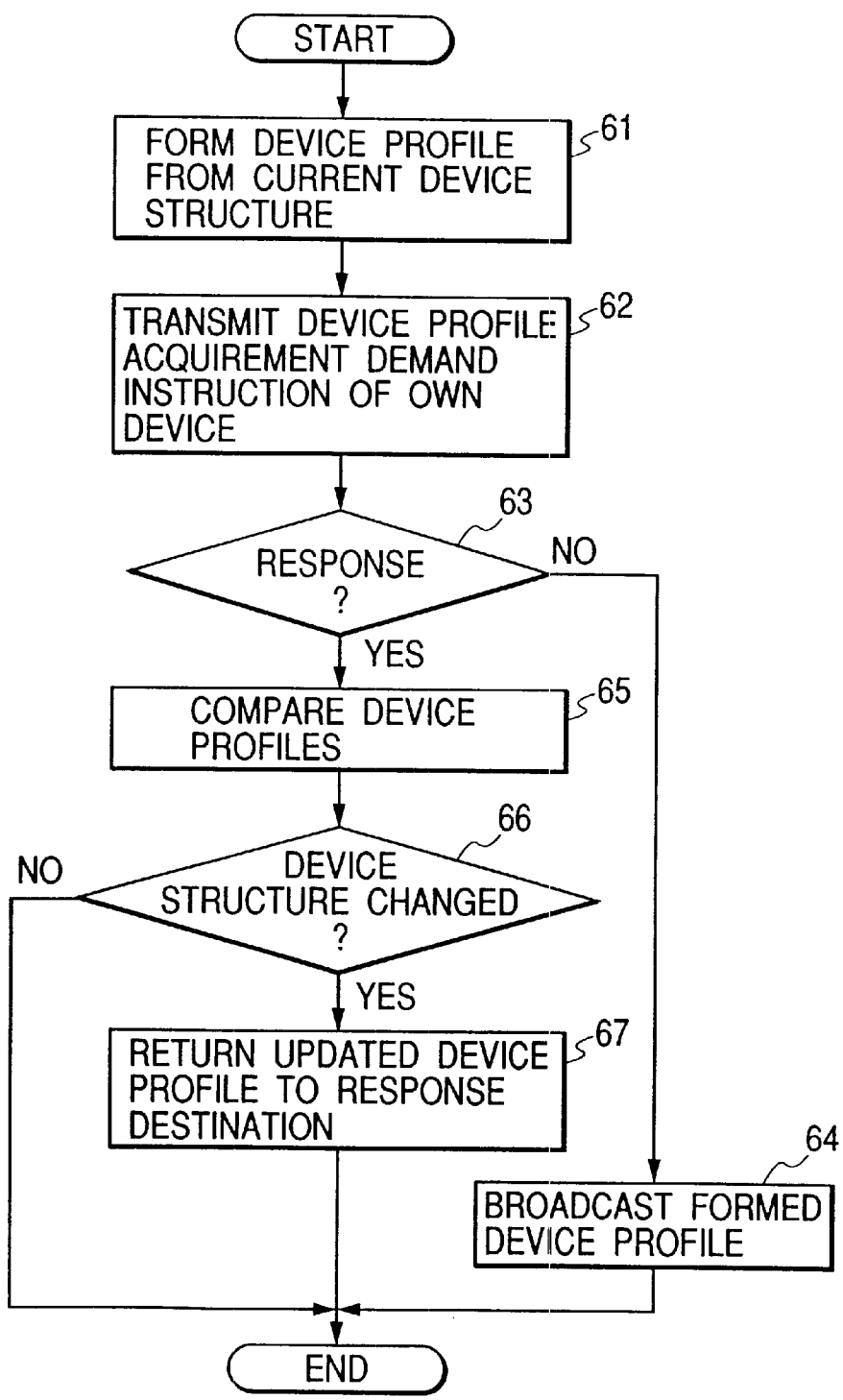
FIG. 19 is a flow chart showing processing to form a device profile.

FIG. 19 is the flow chart showing the processing to be performed in a case where device information is notified to the network when power supplies of the input and output devices are turned on or when the setting change is performed on the console panel or the like. Such the processing is ordinarily performed by the CPU 51 of the image scanner 50 and the CPU 61 of the laser beam printer 60, but may be performed by the CPU 71 of the host computer 70 to form and/or update the profile of own device.

Initially, in a step S61, the device profile including information shown in FIG. 23 by way of example is formed according to the current device structure. In FIG. 23, for example, "DEVICE-TYPE" represents whether the target device is the input device or the output device, "DEVICE-ID" represents an ID of each device, "DEVICE-ADDRESS" represents a network address of own device, "TRANSMISSION-MODE" represents a supporting transfer protocol, "RESOLUTION" represents data processing resolution, "MEDIA-SIZE" represents a supporting paper size, and "DATA-FORMAT" represents a supporting data format.

Subsequently, in a step S62, in order to confirm whether or not the information at the time when the setting was previously changed still exists, the instruction to acquire the device profile of own device is transmitted to the network. In a subsequent step S63, it is judged whether or not a response to the instruction is received from the network in a certain time. If judged that the response is received, the flow advances to a step S65 to compare the device profile formed in the step S61 with the device profile from which the response is transmitted.

It is then judged in a step S66 whether or not the contents of the device profile were changed. If judged that the contents were changed, the flow advances to a step S67 to return the device profile formed in the step S61 to the response destination, and the processing ends. On the other hand, if judged in the step S66 that the contents of the device profile are not changed (i.e., identical), the processing ends as it is.

If judged in the step S63 that there is no response to the device profile acquirement instruction, the flow advances to a step S64 to broadcast (or transmit) the device profile formed in the step S61 to the network as new device information, and then the processing ends.

Figure 20:
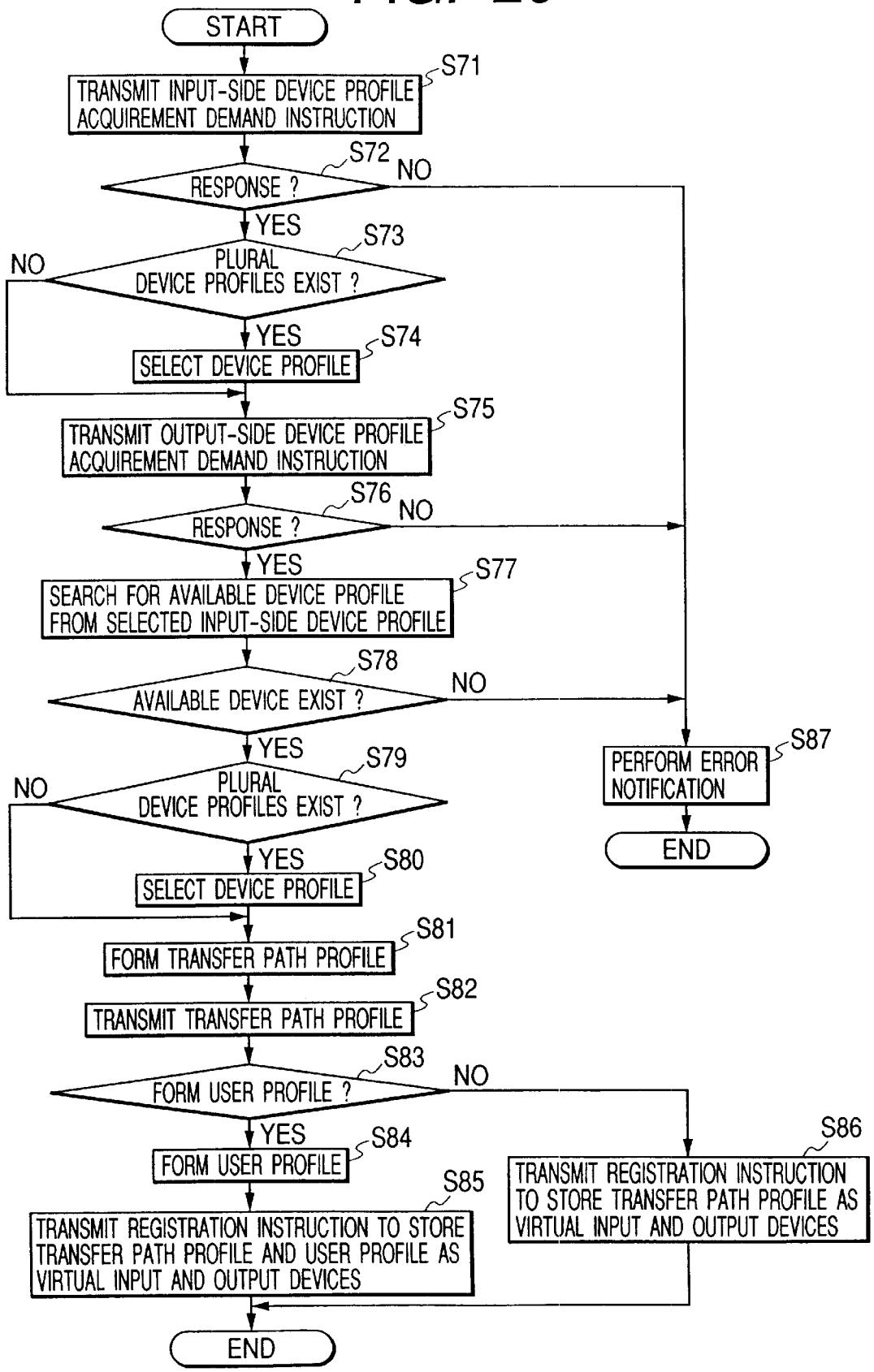
FIG. 20 is a flow chart showing processing to form a virtual profile.

FIG. 20 is a flow chart showing processing in which a transfer system between the input and output devices is determined based on the device information of the input and output devices so as to form logical (or virtual) input and output devices. This processing is ordinarily performed by the CPU 71 of the host computer 70, but may be performed by the CPU 51 of the image scanner 50 or the CPU 61 of the laser beam printer 60.

Initially, in a step S71, an instruction to acquire the device profile of the input device is transmitted, and then it is judged in a step S72 whether or not a response to the instruction is received in a certain time. If judged that the response is received, then it is judged in a step S73 whether or not the plural responding device profiles (i.e., device profiles from which responses are received) exist. If the plural responding device profiles exist, the flow advances to a step S74 to urge the user to select the arbitrary device profile and then temporarily store the selected device profile information in the RAM 72 or the like.

Subsequently, in a step S75, an instruction to acquire the device profile of the output device is transmitted, and then it is judged in a step 76 whether or not a response to the instruction is received in a certain time. If the response is detected in the step S76, then the flow advances to a step S77 to search for the device profile of the output device capable of performing output processing from the input device (called as available output device hereinafter) in accordance with the definition contents of the device profile of the input device selected in the step S74. It should be noted that, for example, the available output device is represented as the device profile of the output device of which value is coincident with that of the device profile of the input device and which exists at items "TRANSMISSION-MODE" and "DATA-FORMAT" of the device profile shown in FIG. 23.

Then it is judged in a step S78 whether or not the available output device exists. If judged that the available output device exists, then it is further judged in a step S79 whether or not the plural coincident output devices exist. If judged that the plural devices exist, then the flow advances to a step S80 to urge the user to select the arbitrary device profile in such the manner as described above.

If the available output device existing is one, or if the device profile is selected by the user, the flow advances to a step S81 to form a transfer path profile shown in FIG. 24 from the selected device profiles of the output and input devices.

For example, in the transfer path profile shown in FIG. 24, "INPUT-DEVICE" represents the device ID defined in the device profile of the input device, "INPUT-ADDRESS" represents a network address of the input device, "OUTPUT-DEVICE" represents the device ID defined in the device profile of the output device, and "OUT-ADDRESS" represents a network address of the output device. "OUTPUT-TRAY" represents the paper discharge destination defined in the device profile of the output device, "TRANSMISSION-MODE", "RESOLUTION", "MEDIA-SIZE" and "DATA-FORMAT" define the values which are coincident between the device profiles of the input and output devices. Even if the plural kinds of coincident values exist, it is possible to select one of them according to previously defined priority order or arbitrary intention of the user.

Then in a step S82, the formed transfer path profile is transmitted to the network to store it in the recording device 81 of the file server 80 capable of being referred by the input device or the output device.

Further, it is judged in a step S83 whether or not a user profile (including additional setting of individual user, change of transfer path profile setting value, or the like) is to be formed. If the user instructs to form the user profile, the flow advances to a step S84 to form such the user profile as shown in FIG. 25.

For example, in FIG. 25, "USER" represents a user name capable of using this user profile. The values defined at "RESOLUTION", "OUTPUT-TRAY", "TRANSMISSION-MODE", "MEDIA-SIZE" and "DATA-FORMAT" represent the values forcedly set by the user as those substantially the same as the respective values at the corresponding definition items of the transfer path profile. Further, "ERROR-LOG" represents that error information is stored in the storage area at the defined address when an error is occurred in the processing using this user profile.

Then in a step S85, a registration instruction to store a pair of the transfer path profile (FIG. 24) and the user profile (FIG. 25) in the recording device 81 of the file server 80 as the virtual input and output devices according to such the definition form as shown in FIG. 26 is transmitted, and the processing ends.

In FIG. 26, "TRANSMISSION PROFILE" represents the transfer path profile, "USER PROFILE" represents the user profile, and "DISPLAY COMMENT" represents the definition message to be displayed on the console panel (e.g., LCD (liquid crystal display)) of the input or output device during the processing using this virtual input and output devices.

On the other hand, if judged in the step S83 that the user profile is not formed, the flow advances to a step S86 to transmit the registration instruction of the virtual input and output devices each defining the transfer path profile, and the processing ends. If there is no response to the device profile acquirement demand instruction in the step S72 or S76, or if the device profile of the available output device can not be detected in the step S78, then error notification is performed to the user in a step S87, and the processing ends.

Figure 21:
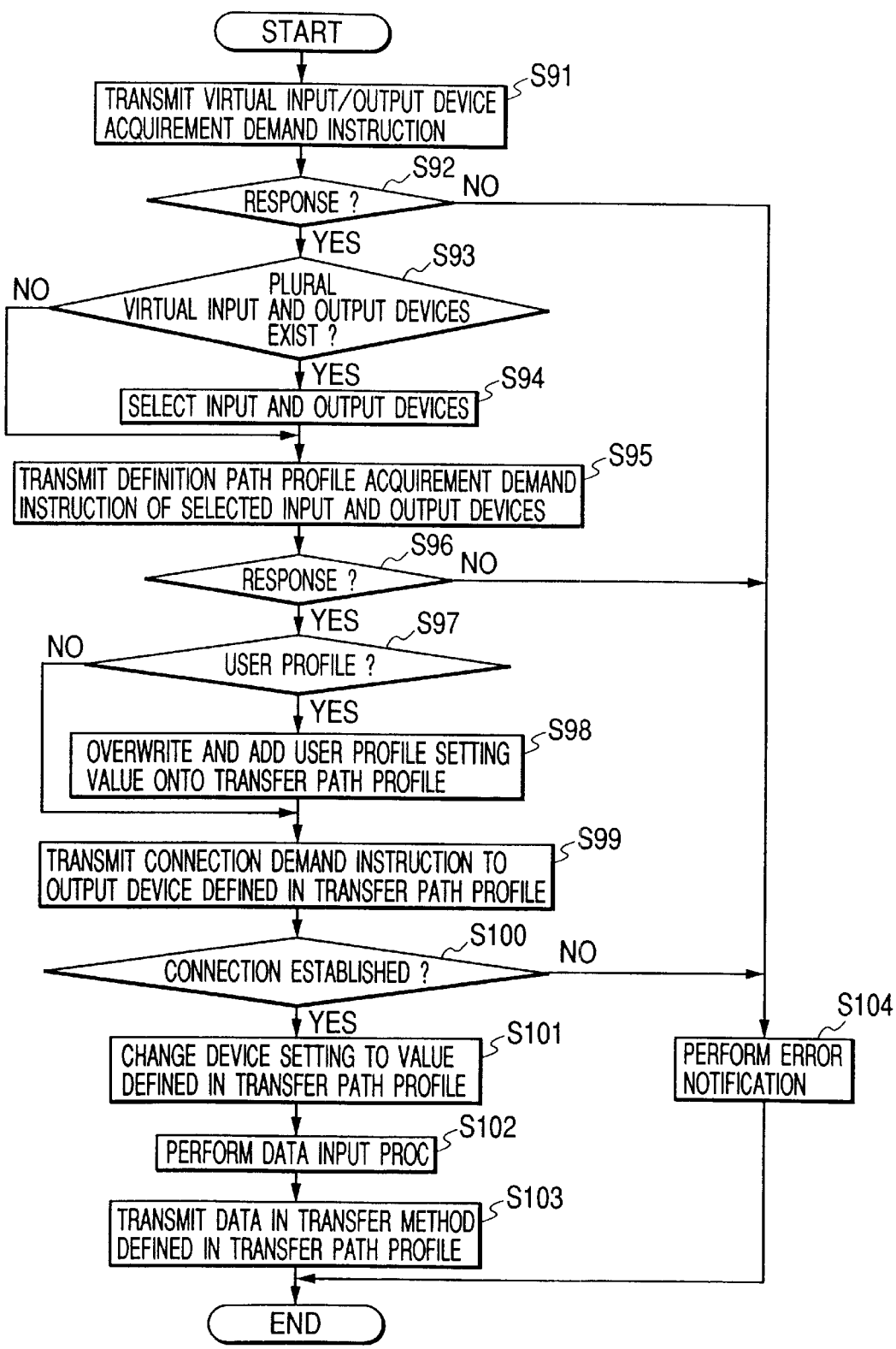
FIG. 21 is a flow chart showing processing in which the virtual profile is used by an input device.

FIG. 21 is a flow chart showing processing in which the data is input from the input device and then transmitted to the output device in accordance with logical (or virtual) input/output device information. This processing is performed by the CPU 51 of the image scanner 50 (i.e., input device).

Initially, if the user instructs start of data input processing from the input device, an acquirement instruction to acquire from the file server 80 the virtual input/output device information previously defined in relation to the input device is transmitted in a step S91. Then it is judged in a step S92 whether or not the server 80 responds to the instruction in a certain time. If the server 80 responds to the instruction, then it is judged in a step S93 whether or not the plural input/output device information responded exist. If judged that the plural information exist, the flow advances to a step S94 to display them on the console panel or the like to urge the user to select the arbitrary virtual input and output devices.

In a step S95, an instruction to acquire a defined profile group including at least the transfer path profile as shown in FIG. 26 is transmitted to the selected virtual input and output devices. Then it is judged in a step S96 whether or not a response to the instruction is received in a certain time. If judged that the response is detected, the flow advances to a step S97 to judge whether or not the user profile is included in the received profile group. If judged that the user profile is included, the flow advances to a step S98 to additionally overwrite the values of the user profile onto the values of the simultaneously received transfer path profile. Thus, all or a part of the value of the transfer path profile is set as the value inherent to the user.

On the other hand, if judged in the step S97 that the user profile is not included, each value of the received transfer path profile is held as it is.

In a step S99, a connection demand including the virtual input/output device information is transmitted to the output device defined by each value of the transfer path profile, and then it is judged in a step S100 whether or not the connection to the output device is established. If judged that the connection is established, in a step S101 the input device is set to have the value defined in the transfer path profile, and then in a step S102 the data input processing is performed. In a step S103, the input data is transmitted to the output device according to the transfer system defined in the transfer path profile, and the processing ends.

On the other hand, if judged in the step S92 or S96 that the file server 80 does not send the response, or if judged in the step S100 that the connection to the output device could not be established, error notification is performed to the user in a step S104, and the processing ends.

FIG. 22 is a flow chart showing processing in which the output device receives the data transmitted from the input device and then outputs the data in accordance with the logical (or virtual) input/output device information. This processing is performed by the CPU 61 of the laser beam printer 60 (i.e., output device).

Initially, if the connection demand from the input device is detected in a step S111, then the virtual input and output devices to which the connection is demanded are confirmed in a step S112. In a subsequent step S113, an instruction to acquire the defined profile group including at least the transfer path profile as shown in FIG. 26 is transmitted to the file server 80. Then it is judged in a step S114 whether or not a response to the instruction is received in a certain time. If the response is detected, the flow advances to a step S115 to further judge whether or not the user profile is simultaneously received. If the user profile is also detected, the flow advances to a step S116 to additionally overwrite the values of the user profile onto the values of the simultaneously received transfer path profile.

In a step S117, the output device is set to have the value defined in the transfer path profile, and the flow advances to a step S118 establish the connection to the input device from which the connection demand is transmitted. Then the data transmitted according to the value defined by the transfer path profile is received in a step S119, the data output processing is performed in a step S120, and the processing ends.

On the other hand, if judged in the steps S114 and S115 that the file server 80 does not respond to the instruction, error notification is performed to the user in a step S121, and the processing ends.

In the present embodiment, the file server 80 is assumed as the storage destination into which the device profile, the transfer path profile, the user profile and the definition information of the virtual input and output devices are stored. However, in a case where the file server 80 does not exist, the input and output devices themselves can directly notify the demanding device of current structure information when the device profile acquirement demand is received from such the demanding device. Further, it is possible to previously store the transfer path profile, the user profile and the virtual input/output device definition into the recording device of the host computer which formed these data, and then notify the demanding input or output device of these data when the demand is received from such the device. Further, after the transfer path profile, the user profile and the virtual input/output device definition are formed, it is possible to transmit these data to the destination input and output devices to store them into the recording units of these devices, such that these data can be acquired from either device.

Further, in the same manner as above, it is possible to define in the transfer path profile the plural output devices being output destinations. Thus, the output processing of the plural copies can be performed by user's one-time handling. Further, the plural different output results can be simultaneously acquired.

Figure 27A:
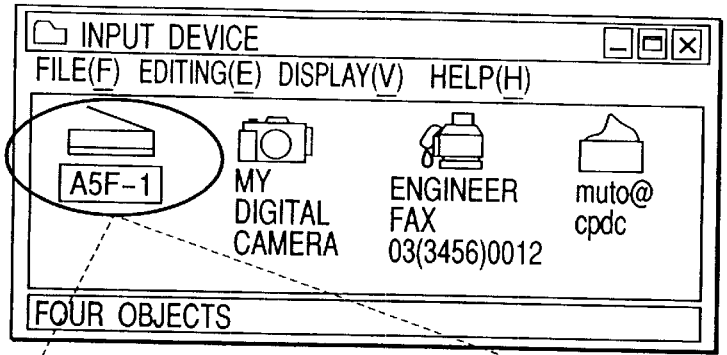
FIGS. 27A, 27B and 27C are views showing an example of a procedure to form the virtual input and output devices by a GUI (graphical user interface)
Figure 27B:
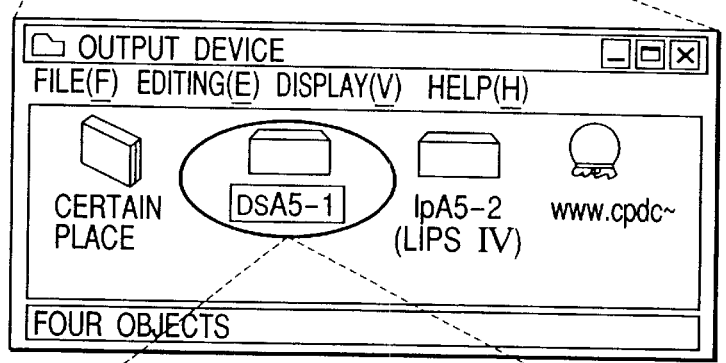
Figure 27C:
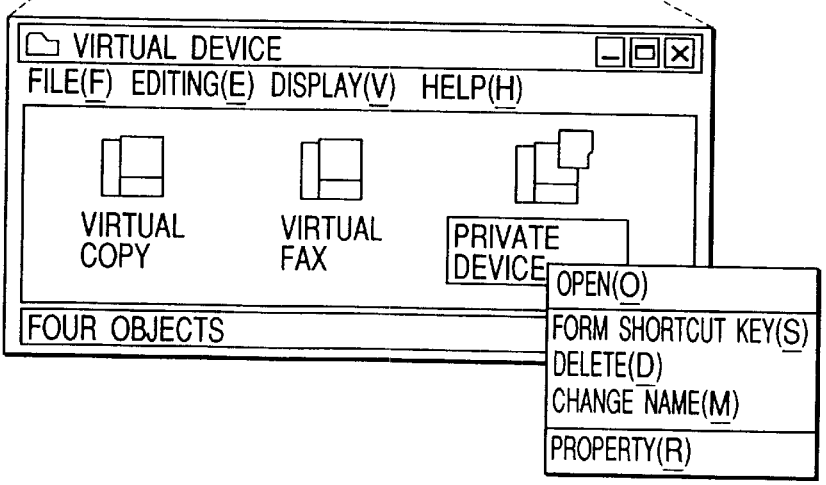

In a case where the virtual input and output devices are formed on the screen of the host computer, such the forming operation can be significantly improved by using a GUI as shown in FIGS. 27A to 27C. That is, initially, as shown in FIG. 27A, the plural device profiles of the input devices are displayed. Subsequently, after the user selects desired one of these profiles, the device profile of the output device capable of performing output processing is searched based on the selected device profile of the input device, and the searched device profile is displayed as shown in FIG. 27B. Further, if the user selects the device profile of the desired output device in the displayed profile, the list of the virtual input and output devices together with the already registered virtual input and output devices is displayed as shown in FIG. 27C.

Figure 28:
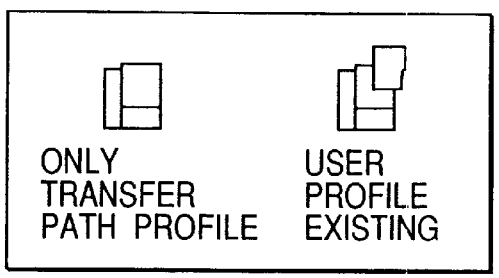
FIG. 28 is a view showing an example of icons of virtual input/output device definition profile by the GUI.

Further, in order to discriminate whether the user profiles have been defined for the formed virtual input and output devices, it is possible to change displayed icons as shown in FIG. 28. Thus, it is possible for the user to more easily handle the devices and effectively define the logical input and output devices.

As explained above in detail, the device on the input side and the device on the output side can be previously paired and defined, whereby the instruction can be issued from either side. Thus, since it is unnecessary to perform the complicated setting every time the input processing and the output processing are actually performed, it is possible for the user to easily handle the entire apparatus, increase user's working efficiency and thus shorten an entire processing time. Further, since it is unnecessary to temporarily store the input data from the input device in the host computer or the file server and then transfer the stored data to the output device, it is possible to reduce the resource loads (recording device, CPU, RAM and the like) of the host computer and the file server.

(Third Embodiment)

Hereinafter, the third embodiment of the present invention will be explained in detail with reference to the annexed drawings.

<Structural Example of Multifunctional System>

Figure 29:
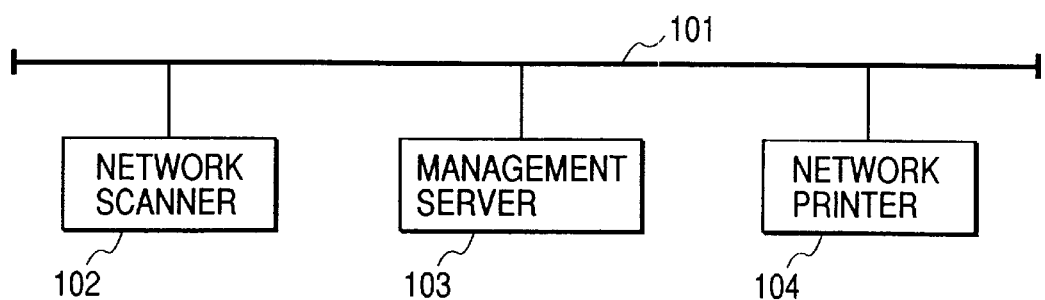
FIG. 29 is a conceptional block diagram showing a structural example of a multifunctional system according to the third embodiment of the present invention.

FIG. 29 is a conceptional block diagram for explaining a structural example of a multifunctional system according to the third embodiment.

In FIG. 29, a network 101 uses known technique to connect various devices. In the present embodiment, it is assumed that the network 101 uses an Ethernet using a TCP/IP protocol.

A network scanner 102 reads a document printed on a paper (or sheet) or the like, in an optical manner. The scanner 102 has a network interface and is thus connected to the various devices through the network 101.

Since a management server 103 includes information (called as transfer path profile hereinafter) used to structure a virtual MFP (multifunctional device) based on the combination of the network scanner 102 and a network printer 104, the server 103 provides the transfer path profile in response to demands from input and output devices. Ordinarily, the management server can be realized by loading server software into a personal computer or a work station. Since the server 103 has a network interface and is thus connected to the various devices through the network 101.

The network printer 104 has a network interface and thus receives print data and image data sent through the network interface, and then actually prints the received data onto a medium such as the sheet or the like by using known printing technique such as electrophotographic technique or the like. Also, the network printer 104 is connected to the various devices through the network 101.

In the present embodiment, it is assumed that the image data transmitted from the network scanner can be immediately printed by the network printer 104. Ordinarily, the image data is once converted into a known PDL (page description language) and then transmitted. Since the details of the PDL have been well known, the explanation thereof will be omitted.

<Structural Example of Network Scanner>

Figure 30:
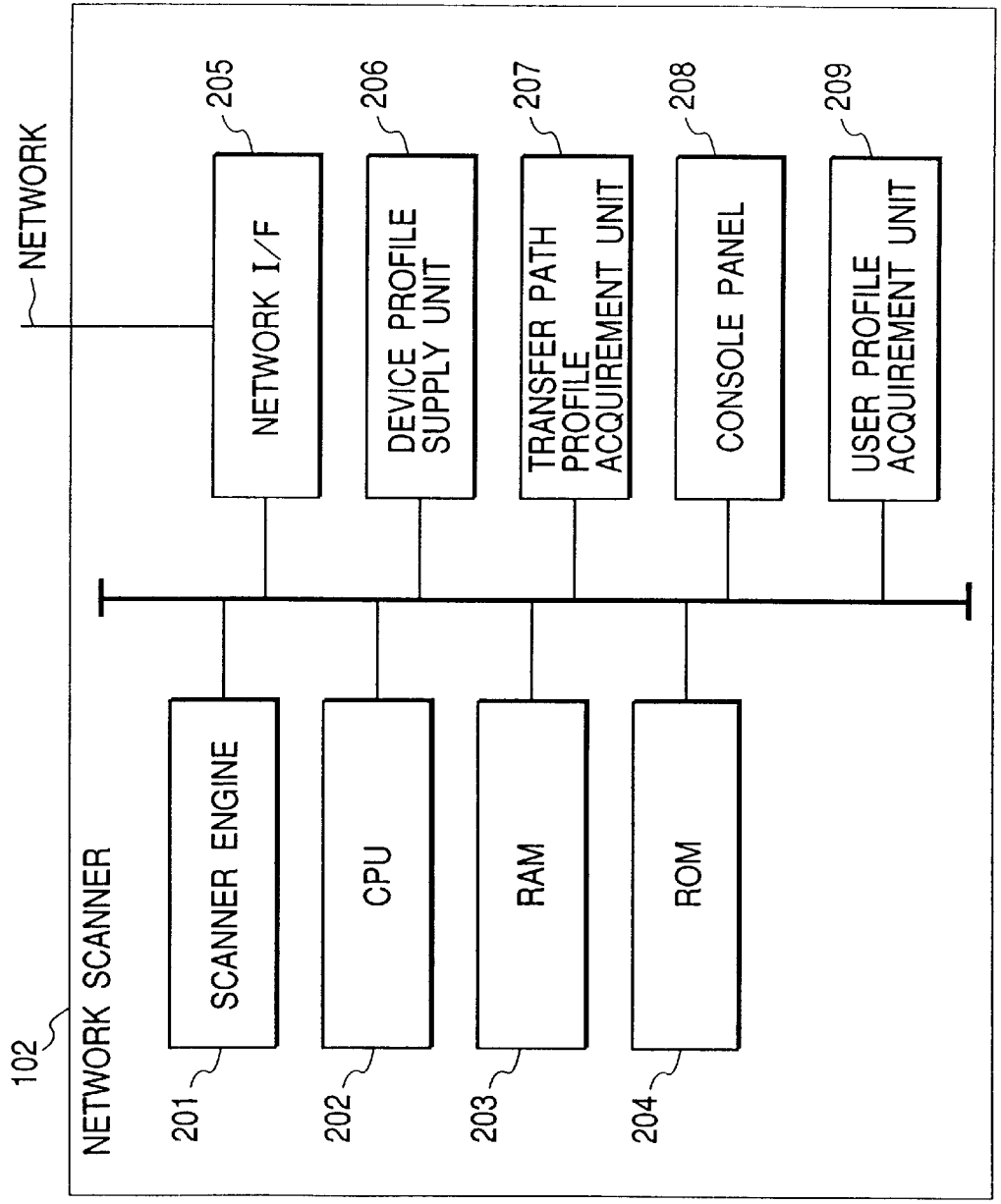
FIG. 30 is a block diagram showing a structural example of a network scanner.

FIG. 30 is a block diagram showing a structural example of the network scanner 102.

In FIG. 30, a scanner engine 201 is the scanner engine which uses known optical reading technique, and a CPU 202 is the calculation and control processor which controls an entire operation of the network scanner 102. A RAM 203 is the random access memory which temporarily stores therein the image data read by the scanner engine 201 and the information used in the working. Further, the RAM 203 stores therein programs loaded through a not-shown external storage device or the network. A ROM 204 is the read-only memory which stores therein programs to control the operation of the CPU 202.

Further, a network I/F 205 is the interface which connects with the network 101. A device profile supply unit 206 has a function to transmit device information of the network scanner 102 to the management server 103. A transfer path profile acquirement unit 207 has a function to acquire the transfer path profile from the management server and store the acquired information into the RAM 203. A console panel 208 is the console panel which is composed of a display unit (e.g., LCD, LED or the like) and plural operation buttons so as to provide a user interface. A user profile acquirement unit 209 has a function to acquire the user profile from the management server and store the acquired information into the RAM 203.

<Structural Example of Network Printer>

Figure 31:
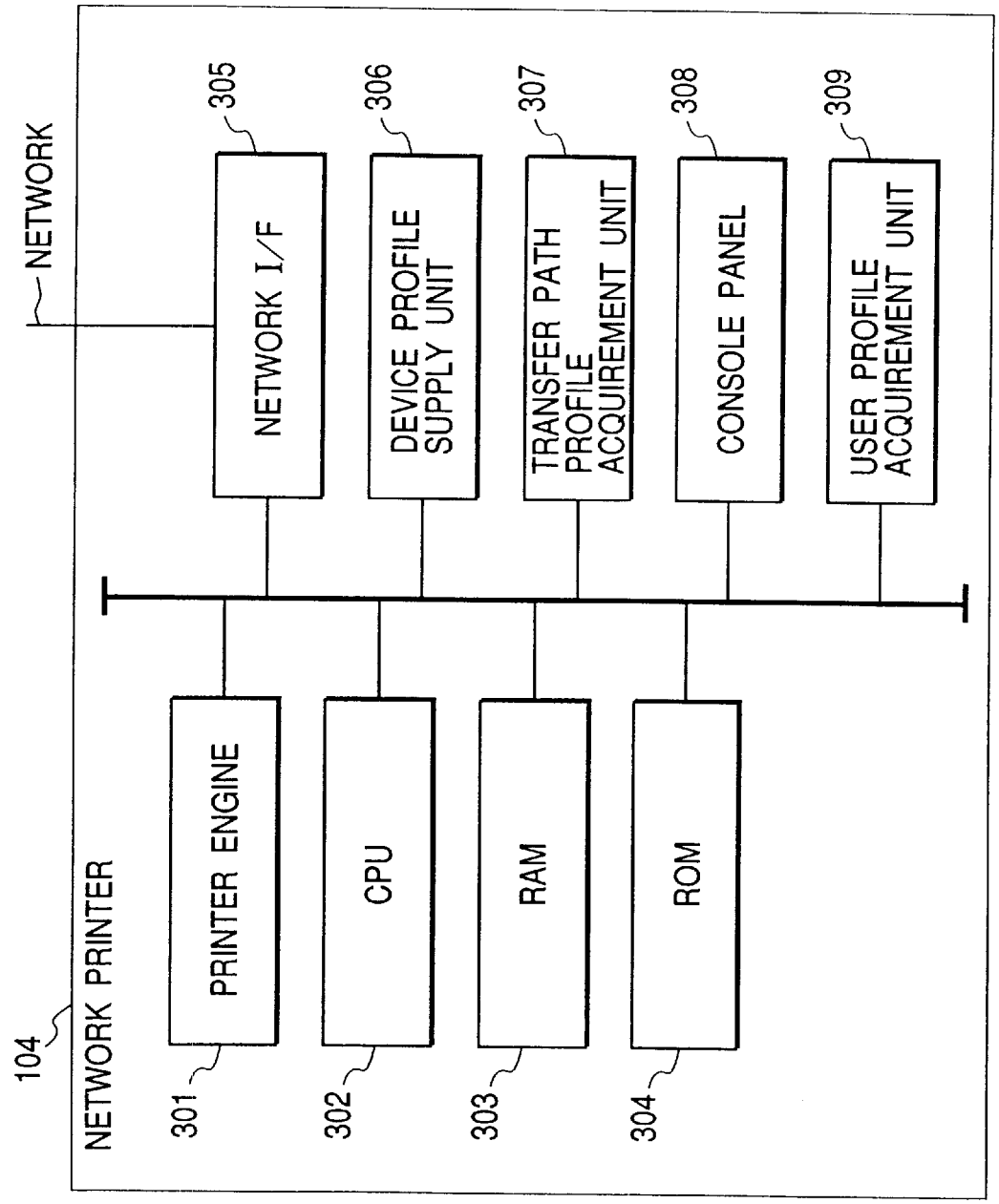
FIG. 31 is a block diagram showing a structural example of a network printer.

FIG. 31 is a block diagram showing a structural example of the network printer 104.

In FIG. 31, a printer engine 301 is the printer engine which uses known printing technique such as electrophotography, inkjet technique or the like, and a CPU 302 is the calculation and control processor which controls an entire operation of the network printer 104. A RAM 303 is the random access memory which temporarily stores therein the image data printed by the printer engine 301 and the information used in the working. Further, the RAM 303 stores therein programs loaded through a not-shown external storage device or the network. A ROM 304 is the read-only memory in which programs to control the operation of the CPU 302 have been written.

Further, a network I/F 305 is the interface which connects with the network 101. A device profile supply unit 306 has a function to transmit device information of the network printer 104 to the management server 103. A transfer path profile acquirement unit 307 has a function to acquire the transfer path profile from the management server and store the acquired information into the RAM 303. A console panel 308 is the console panel which is composed of a display unit (e.g., LCD, LED or the like) and plural operation buttons so as to provide a user interface. A user profile acquirement unit 309 has a function to acquire the user profile from the management server and store the acquired information into the RAM 303.

<Structural Example of Management Server>

Figure 32:
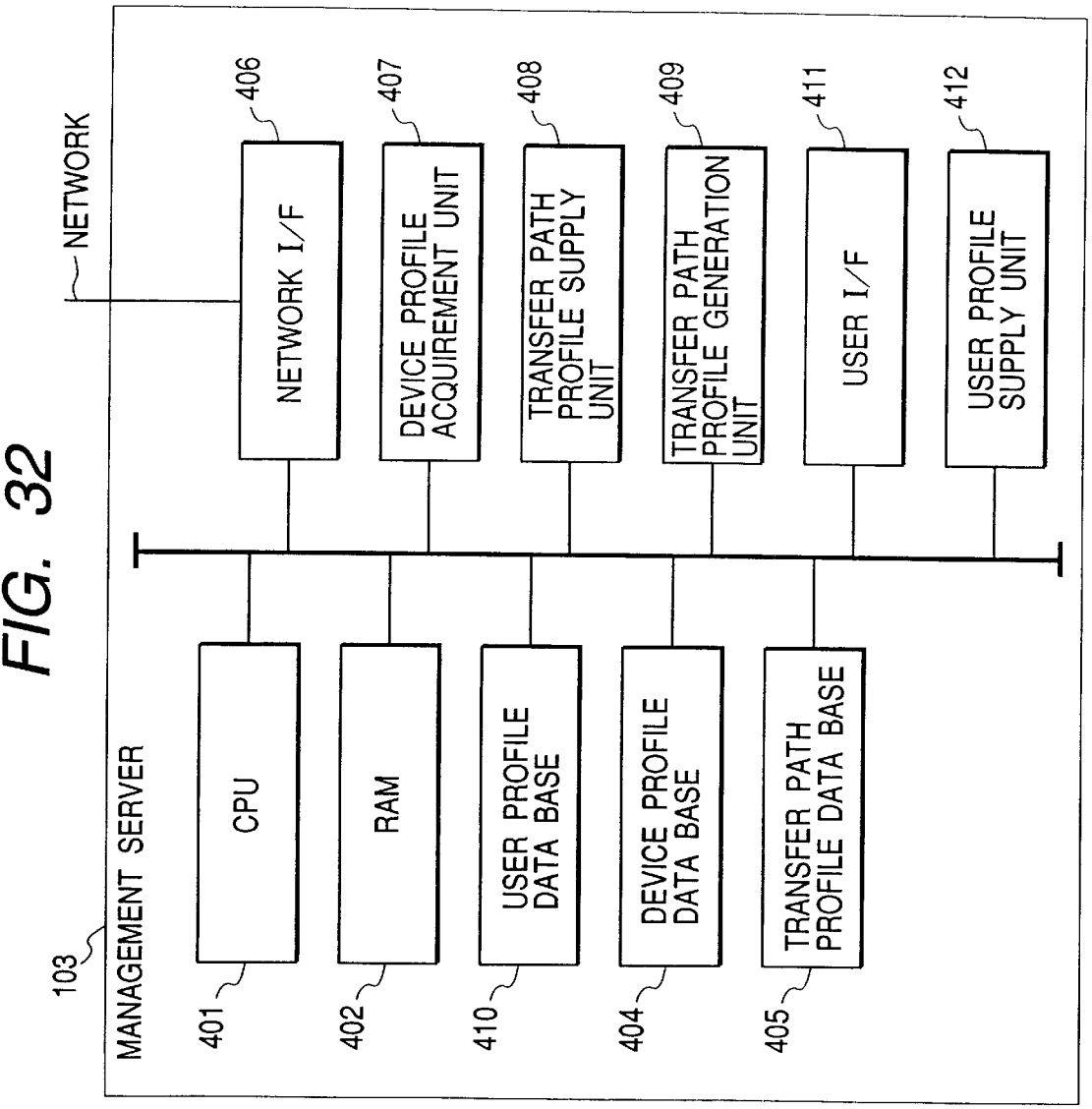
FIG. 32 is a block diagram showing a structural example of a management server.

FIG. 32 is a block diagram showing a structural example of the management server 103.

In FIG. 32, a CPU 401 is the calculation and control processor which controls an entire operation of the management server 103. A RAM 402 is the random access memory which stores therein the information used in the working and programs to control the operation of the CPU 401. A device profile data base 404 is the data base which stores therein device profiles of the devices connected to the network. A transfer path profile data base 405 is the data base which stores therein the transfer path profile generated from the device profile.

A network I/F 406 is the interface which connects with the network 101. A device profile acquirement unit 407 has a function to acquire the device profile from the device connected to the network and store the acquired profile into the device profile data base 404. A transfer path profile supply unit 408 has a function to read the transfer path profile from the transfer path profile data base 405 and then supply the read profile to the device through the network in accordance with a demand of the device.

A transfer path profile generation unit 409 has a function to generate the transfer path profile based on the device information written in the device profile data base 402 and to write the generated profile into the transfer path profile data base 405. A user profile data base 410 is the data base in which the profile for each user has been stored.

A user I/F 411 is composed of a keyboard and a display monitor which input and edit the user profile to be stored in the user profile data base 410. A user profile supply unit 412 has a function to read the user profile from the user profile data base 410 and then supply the read profile to the device through the network.

<Example of Device Profile>

Subsequently, the device profile will be explained.

The device profile is the data which represents performance and characteristic of each device necessary to structure the virtual MFP (multifunctional device), and includes such text data as shown in FIG. 33.

FIG. 33 shows an example of the device profile in the network scanner 102.

In FIG. 33, "DEVICE-TYPE" represents a kind of device. In the drawing, it is shown that the device is the input device (i.e., scanner).

"DEVICE-ID" represents a model name of the device. In FIG. 33, it is shown that the model name of the device is "SCANNER-XXX".

"DEVICE-ADDRESS" represents a network address of the device. In FIG. 33, it is shown that the network address is "172.16.10.2".

"RESOLUTION" represents resolution which is supported by the device. In FIG. 33, it is shown that the device supports the resolutions 400 dpi, 600 dpi and 1200 dpi.

"MEDIA-SIZE" represents a paper (or sheet) size which is supported by the device. In FIG. 33, it is shown that the device supports the paper sizes A4, A5 and B4.

"INPUT-FEE" represents a charge for use of the device. In FIG. 33, it is shown that eight yen is charged when an image of A4 size and 16 bits is acquired.

"DOCUMENT-FORMAT" represents an image format which is supported by the device. In FIG. 33, it is shown that the device supports outputting of a JPEG (Joint Photographic Experts Group) type image, outputting of a GIF (Graphics Interchange Format) type image and outputting of LIPS (LBP Image Processing System) 4 type PDL.

"INPUT-COMMAND" represents commands to cause the scanner to perform the reading from another device. If "A4/REQ A4-SCAN", a command "REQ A4-SCAN" may be transmitted to the network scanner to read the image of A4 size.

FIG. 34 shows an example of the device profile in the network printer 104.

In FIG. 34, "DEVICE-TYPE" represents a kind of device. In FIG. 34, it is shown that the device is the output device (i.e., laser beam printer).

"DEVICE-ID" represents a model name of the device. In FIG. 34, it is shown that the model name of the device is "LBP-XXX".

"DEVICE-ADDRESS" represents a network address of the device. In FIG. 34, it is shown that the network address is "172.16.10.3".

"RESOLUTION" represents resolution which is supported by the device. In FIG. 34, it is shown that the device supports the resolutions 300 dpi and 600 dpi.

"MEDIA-SIZE" represents a paper size which is supported by the device. In FIG. 34, it is shown that the device supports the paper sizes A3, A4, A5 and B4.

"OUTPUT-FEE" represents a charge for use of the device. In FIG. 34, it is shown that ten yen is charged when a black-and-white image of A4 size is output.

"DOCUMENT-FORMAT" represents an image format which is supported by the device. In FIG. 34, it is shown that the device supports inputting of LIPS 4, N201 and ESC/P (Epson Standard Code for Printer).

<Operational Example of Multifunctional System>

[Collection of Device Profiles]

The device profiles of the devices are acquired by the device profile acquirement unit 407 of the management server 103.

Figures 35, 36:
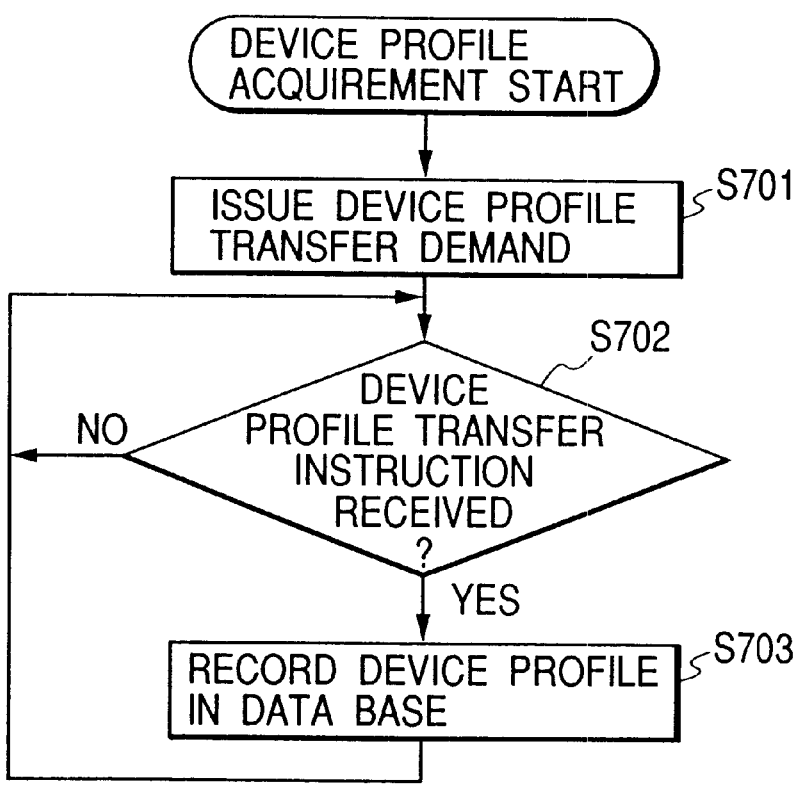
FIG. 35 is a flow chart showing an operational example of a device profile acquirement unit in the management server.
FIG. 36 is a view showing a structural example of a device profile acquirement instruction.

FIG. 35 is a flow chart showing the operational example of the device profile acquirement unit 407. In this case, it should be noted that the unit 407 starts up together with the server 103, and operates until the system ends.

Initially, in a step S701, a device profile acquirement instruction (i.e., device profile transfer demand) is issued to the devices connected to the network only once when the device profile acquirement unit 407 starts up. FIG. 36 shows a structure of the device profile acquirement instruction. In FIG. 36, since "REQ" represents a transfer demand (or transfer request) and "DEVICE-PROFILE" represents the device profile, "REQ DEVICE-PROFILE" represents the demand for the device profile as a whole. This instruction is broadcasted to the network in the form of UDP (User Datagram Protocol) packet of TCP/IP.

Figures 37, 38:
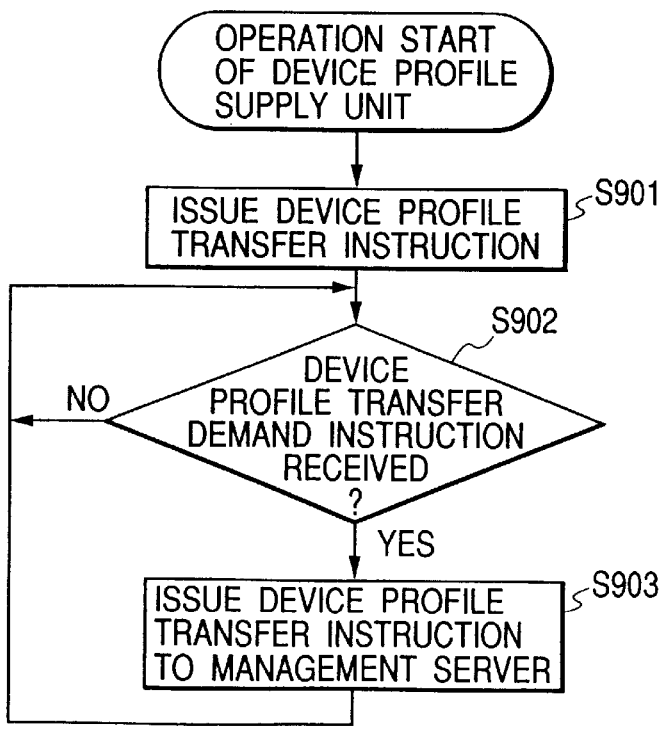
FIG. 37 is a view showing a structural example of a device profile transfer instruction.
FIG. 38 is a flow chart showing an operational example of a device profile supply unit in each of input and output devices.

Then it is judged in a step S702 whether or not a device profile transfer instruction (i.e., device profile transfer demand) reached the device. If judged that the instruction does not reach yet, the flow repeats the step S702. FIG. 37 shows a structure of the device profile transfer instruction. At the first line of FIG. 37, since "SEND" represents the transfer and "DEVICE-PROFILE" represents the device profile, "SEND DEVICE-PROFILE" represents the transfer of the device profile as a whole. Like FIG. 33, the following lines represent the contents of the device profile. This instruction ends by "END_OF_PROFILE" at the final line.

If the device profile is transferred, the device profile acquirement unit records the device profile into the device profile data base 404 in a step S703, and the flow returns to the step S702 to wait for a next device profile transfer instruction.

Subsequently, how to transfer the device profile from the device side will be explained.

FIG. 38 is a flow chart showing the operational example of the device profile supply unit at the device side. It should be noted that numeral 206 (FIG. 30) denotes the device profile supply unit in the network scanner 102, and numeral 306 (FIG. 31) denotes the device profile supply unit in the network printer 104. Further, it should be noted that the device profile supply unit is called when the device starts up, and the unit continues operating until the power of the device is turned off.

In a step S901 of FIG. 38, the device transfers the device profile to the management server 103 only once when the device starts up. If the server 103 has started up, the device profile transfer instruction is received in the step S702 (FIG. 35), and thus the received instruction is reflected in the device profile data base 404. On the other hand, if the server 103 does not start up, the device profile transfer instruction is not reflected in the device profile data base 404 of the management server 103.

In a step S902, it is judged whether or not a device profile transfer demand instruction reached the device. If the instruction does not reach yet, the flow repeats the step S902. If the device profile transfer demand instruction is sent from the management server 103, in a step S903 the device profile transfer instruction is sent to the management server 103 in the same manner as in the step S901.

Such the processing is to set the device information to be reflected in the device profile data base 404 in a case where the device starts up and then the management server 103 starts up. Since in the step S701 (FIG. 35) the device profile acquirement unit 407 of the management server 103 issues the device profile transfer demand instruction when the server 103 starts up, it is possible to assure that management server 103 always acquires the device profiles of all the devices connected to the network.

[Generation of Transfer Path Profile]

In the management server 103, the transfer path profile generation unit 409 generates the transfer path profile on the basis of the device information written in the device profile data base 404, and then stores the generated profile in the transfer path profile data base 405. In this case, it should be noted that the transfer path profile is automatically generated based on the comparison between the data formats of the input and output devices, or based on operator's instructions and changes.

FIG. 39 shows a structural example of the generated transfer path profile.

In FIG. 39, "DESCRIPTION" represents a character string to be displayed on a panel of the device when a transfer path is selected. In this case, it is shown that the selected transfer path is "COPY SCANNER-XXX TO LBP-XXX".

"INPUT-DEVICE" represents a type of input device, and "OUTPUT-DEVICE" represents a type of output device.

"INPUT-ADDRESS" represents a network address of the input device, and "OUTPUT-ADDRESS" represents a network address of the output device.

"DOCUMENT-FORMAT" represents a document format to be used in the selected transfer path.

"COPY-DEFAULT" represents the number of copies to be used as default.

"RESOLUTION" represents resolution in the selected transfer path.

"INPUT-COMMAND" represents information written in the device profile of the input device. This information is the command to cause the input device to perform data reading.

[Supply of Transfer Path Profile]

Ordinarily, the management server has one or more transfer path profiles and supplies the transfer path profile in accordance with demands from the input and output devices.

Figure 40:
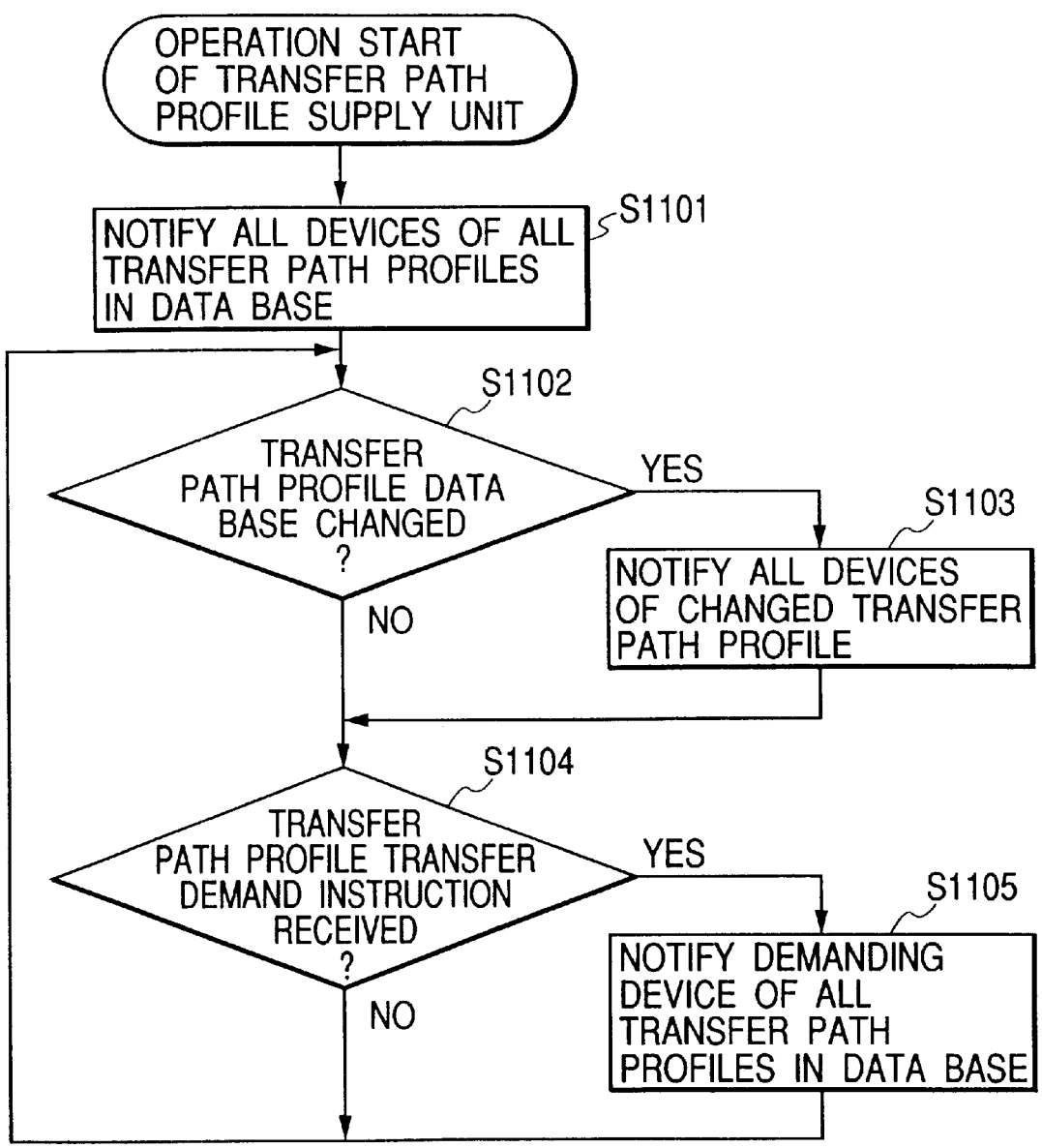
FIG. 40 is a flow chart showing an operational example of a transfer path profile supply unit in the management server.

FIG. 40 is a flow chart showing an operational example of the transfer path profile supply unit 408 in the management server 103. In this case, it should be noted that the unit 408 starts up together with the server 103.

Initially, in a step S1101, all the transfer path profiles stored in the transfer path profile data base 405 when the supply unit started up are notified to all the devices connected to the network in response to the transfer path profile transfer instruction. Such notification is performed as broadcasting notification.

In a step S1102, it is judged whether or not the transfer path profile data base 405 is changed. If the data base 405 is changed, the flow advances to a step S1103 to notify the changed transfer path profile to all the devices connected to the network. Such notification is also performed as broadcasting notification.

In a step S1104, it is judged whether or not the transfer path profile transfer demand instruction has been received from each device. If judged that the instruction has been received, the flow advances to a step S1105 to notify all the transfer path profiles stored in the data base 405 to the demanding device in response to the transfer path profile transfer instruction.

If judged in the step S1102 that the transfer path profile data base 405 is not changed, and if judged in the step S1104 that the transfer path profile transfer demand instruction is not received, the flow repeats the steps S1102 and S1104.

FIG. 41 shows a structural example of the transfer path profile demand instruction. In FIG. 41, since "REQ" represents a transfer demand (or transfer request) and "TRANSMISSION-PATH-PROFILE" represents the transfer path profile, "REQ TRANSMISSION-PATH-PROFILE" represents the demand for the transfer path profile as a whole.

Figures 42, 43:
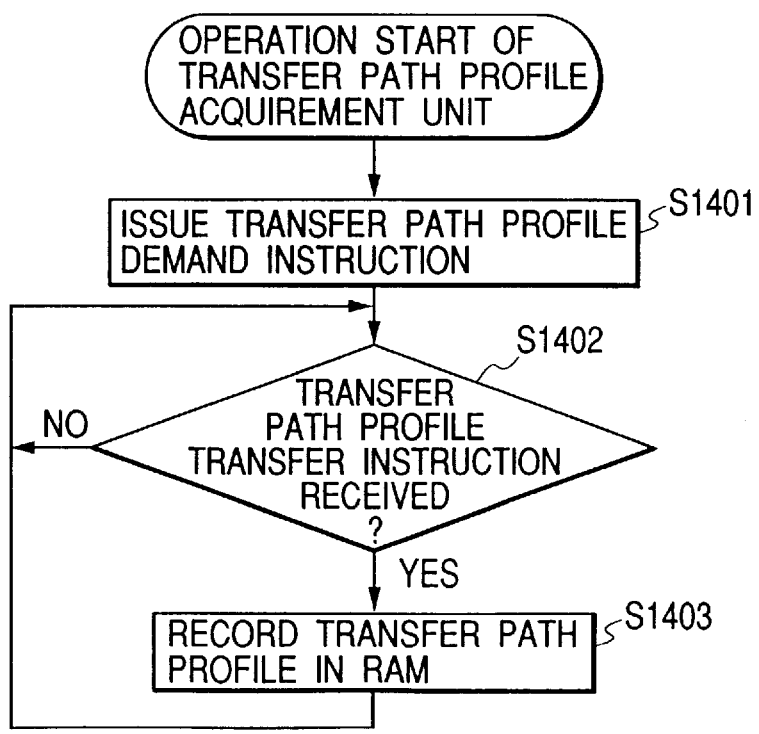
FIG. 42 is a view showing a structural example of a transfer path profile transfer instruction.
FIG. 43 is a flow chart showing an operational example of a transfer path profile acquirement unit in each of the input and output devices.

FIG. 42 shows a structural example of the transfer path profile transfer instruction. In FIG. 42, since "SEND" at the first line represents the transfer (or sending) and "TRANSMISSION-PATH-PROFILE" at the same line represents the transfer path profile, "SEND TRANSMISSION-PATH-PROFILE" represents the transfer of the transfer path profile as a whole. Like FIG. 39, the following lines represent the contents of the transfer path profile. This instruction ends by "END_OF_PROFILE" at the final line.

FIG. 43 is a flow chart showing an operational example of the transfer path profile acquirement unit in each of the input and output devices. It should be noted that numeral 207 (FIG. 30) denotes the transfer path profile acquirement unit in the network scanner 102, and numeral 307 (FIG. 31) denotes the transfer path profile acquirement unit in the network printer 104.

Initially, in a step S1401 of FIG. 43, in order to acquire the transfer path profile, the device issues the transfer path profile demand instruction to the management server 103. In response to this instruction, the transfer path profile supply unit 408 in the server 103 receives the instruction, whereby the step S1104 (FIG. 40) results in "YES" and the flow advances to the step S1105 to transfer the transfer path profile.

If the transfer path profile is transferred in response to the transfer path profile transfer instruction in a step S1402, the transferred profile is stored in the RAM (i.e., RAM 203 of network scanner 102 in FIG. 30; RAM 303 of network printer 104 in FIG. 31) in a step S1403.

By the above processing, each device acquires the transfer path profile from the management server 103 and then stores it in the RAM 203 or 303.

[Generation of User Profile]

Subsequently, the user profile will be explained.

The user profile previously defines the available input and output devices for each user. Since the user profile can be input from the user I/F 411 of the management server 103 and edited, the user profile is previously edited prior to the use of system and stored in the user profile data base 410.

FIG. 44 shows an example of the user profile stored in the user profile data base 410.

In FIG. 44, "USER" represents a user name which is an individual ID to discriminate the user. Each user has a different name, and such the name is displayed on the panel of the device. In FIG. 44, it is shown that the user in question has been registered as the name "KAJIMA".

"GROUP" represents an organization and business rank of the user in question. In FIG. 44, it is shown that he belongs to the group named "DESIGN, PROJECT".

"PASSWORD" represents a password to certify the user in question. In FIG. 44, it is shown that his password is "1234".

"INPUT-DEVICE" represents a name of the input device capable of being used by the user in question. In FIG. 44, it is shown that he can use the input devices named "SCANNER 001" and "SCANNER 008".

"OUTPUT-DEVICE" represents a name of the output device capable of being used by the user in question. In FIG. 44, it is shown that he can use the output devices named "LBP 07" and "LBP 05".

[Supply of User Profile]

Ordinarily, the management server 103 has one or more user profiles and supplies the user in accordance with demands from the input and output devices.

Figure 45:
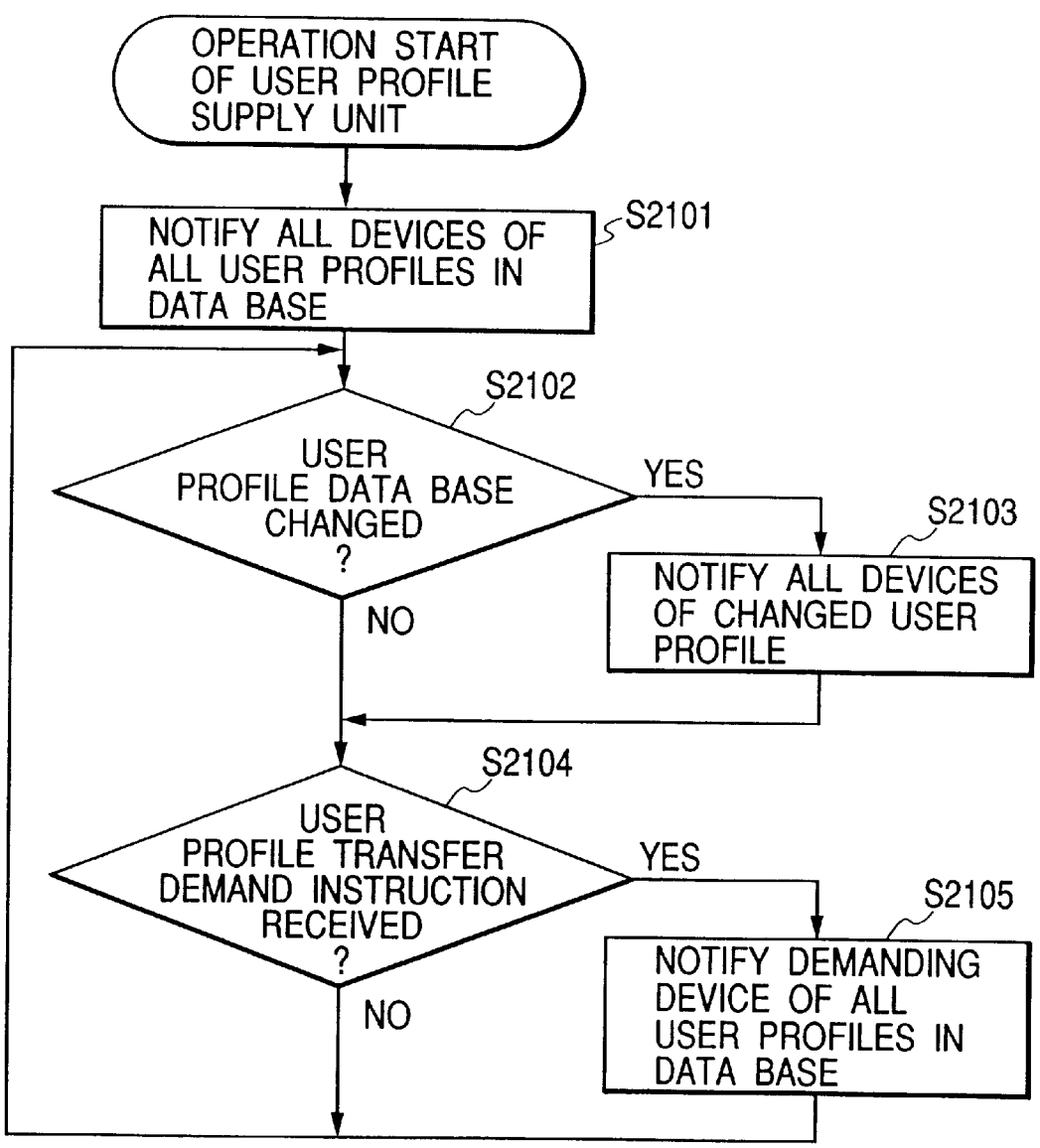
FIG. 45 is a flow chart showing an operational example of a user profile supply unit in the management server.

FIG. 45 is a flow chart showing an operational example of the user profile supply unit 412 in the management server 103. In this case, it should be noted that the unit 412 starts up together with the server 103.

Initially, in a step S2101, all the user profiles stored in the user profile data base 410 when the supply unit started up are notified to all the devices connected to the network in response to a user profile transfer instruction. Such notification is performed as broadcasting notification.

In a step S2102, it is judged whether or not the user profile data base 410 is changed. If the data base 410 is changed, the flow advances to a step S2103 to notify the changed user profile to all the devices connected to the network. Such notification is also performed as broadcasting notification.

In a step S2104, it is judged whether or not the user profile transfer demand instruction has been received from each device. If judged that the instruction has been received, the flow advances to a step S2105 to notify all the user profiles stored in the user profile data base 410 to the demanding device in response to the user profile transfer instruction.

FIG. 46 shows a structural example of the user profile demand instruction. In FIG. 41, since "REQ" represents a transfer demand (or transfer request) and "TRANSMISSION-USER-PROFILE" represents the user profile, "REQ TRANSMISSION-USER-PROFILE" represents the demand for the user profile as a whole.

Figures 47, 48:
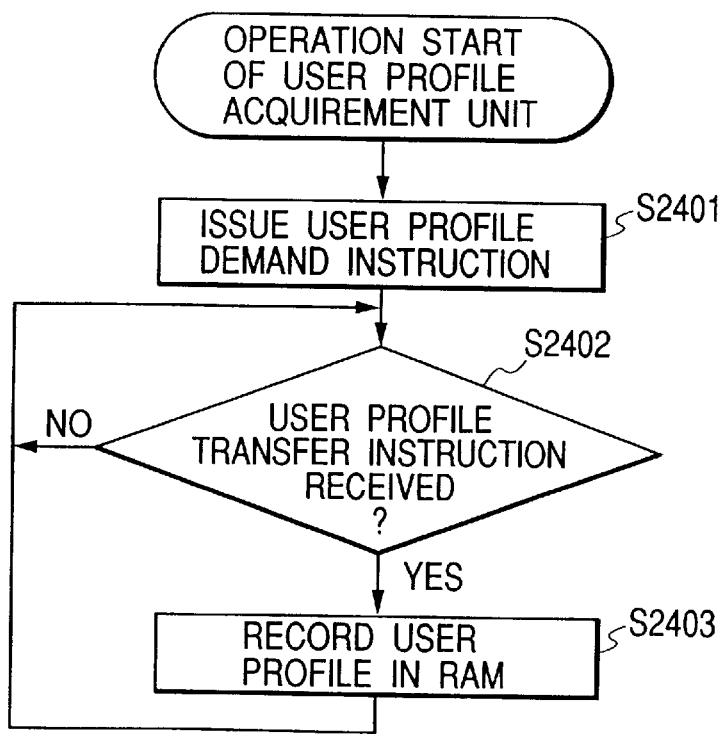
FIG. 47 is a view showing a structural example of a user profile transfer instruction.
FIG. 48 is a flow chart showing an operational example of a user profile acquirement unit in each of the input and output devices.

FIG. 47 shows a structural example of the user profile transfer instruction. In FIG. 47, since "SEND" at the first line represents the transfer (or sending) and "TRANSMISSION-USER-PROFILE" at the same line represents the user profile, "SEND TRANSMISSION-USER-PROFILE" represents the transfer of the user profile as a whole. Like FIG. 44, the following lines represent the contents of the user profile. This instruction ends by "END_OF_PROFILE" at the final line.

FIG. 48 is a flow chart showing an operational example of the user profile acquirement unit in each of the input and output devices. It should be noted that numeral 209 (FIG. 30) denotes the user profile acquirement unit in the network scanner 102, and numeral 309 (FIG. 31) denotes the user profile acquirement unit in the network printer 104.

Initially, in a step S2401, in order to acquire the user profile, the device issues the user profile demand instruction to the management server 103. In response to this instruction, the user profile supply unit 412 in the server 103 receives the instruction, whereby the step S2104 (FIG. 45) results in "YES" and the flow advances to the step S2105 to transfer the user profile.

If the user profile is transferred in response to the user profile transfer instruction in a step S2402, the transferred profile is stored in the RAM (i.e., RAM 203 of network scanner 102 in FIG. 30; RAM 303 of network printer 104 in FIG. 31) in a step S2403.

By the above processing, each device acquires the user profile from the management server 103 and then stores it in the RAM 203 or 303.

[Example of Data Transfer from Scanner to Printer]

Subsequently, processing to actually print an original read from the scanner by the printer will be explained.

Initially, the user sets the original onto the network scanner 102 and then handles the panel for the printing.

Figure 49:
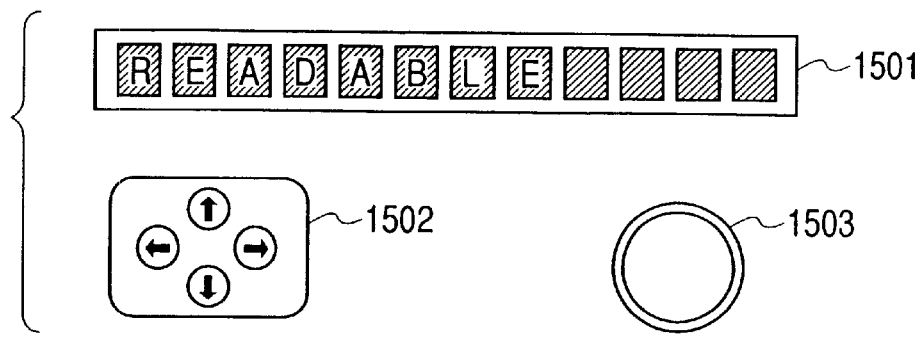
FIG. 49 is a view showing appearance of a console panel of the network scanner.

FIG. 49 is a view showing appearance of the console panel 208 of the network scanner 102. In FIG. 49, numeral 1501 denotes a liquid crystal panel which can display a 12-column character string, numeral 1502 denotes a crisscross key panel which is used to select each function, and numeral 1503 denotes an execution button which is used to execute the scanning.

Thus, the user selects the user profile by depressing the rightward key on the panel 1502.

FIG. 52 is a view showing the contents of the liquid crystal panel 1501 (FIG. 49) in a case where the rightward key on the crisscross panel 1502 is depressed once. That is, since the character string on the panel 1501 shows the contents of "USER" in FIG. 44, the panel represents that the user profile shown in FIG. 44 has been selected.

If the plural user profiles have been registered in the network scanner 102, it is possible to select another profile by further depressing the rightward key on the panel 1502. In the user profile selection in the present embodiment, since only the user profile in which the device name of the scanner 102 has been written at "INPUT-DEVICE" is displayed on the panel, the user can not select another user profile. In any case, if the downward key is depressed, the selected user profile is established or fixed.

If the selected user profile is established, the user inputs a password (or PIN code) in a password input mode. FIG. 53 shows a state that "0" is displayed at the first column of four-column password, "*" (i.e., asterisk) is displayed at the remaining three columns, and a cursor is displayed under "0". In this state, by depressing the upward and downward keys on the panel 1502 of FIG. 49, a numeral in the password can be changed within the range of "0" to "9". After the user sets the correct numeral at one column, he depresses the rightward key to rightward shift the setting column by one and then sets the numeral at the next column. On the other hand, if the user depresses the leftward key, he can return the cursor to the column at which the numeral setting has already ended. If the user ends to input the password suitable for the selected user profile by repeating such an operation as above, he depresses the downward key to establish or fix the password. Then the network scanner 102 compares the input password with the password in the user profile. If the input passwords is coincident with the password in the user profile, then the user selects the transfer path profile. On the other hand, if not coincident, the scanner 102 cancels its operation and returns to a standby state.

Figure 50:
FIG. 50 is a view showing an example of the contents of a liquid crystal panel displayed after the user profile is selected.

If coincident, then the user selects the transfer path profile. FIG. 50 is a view showing an example of the contents on the liquid crystal panel displayed after the password check ends. The panel displays the character string at "DESCRIPTION" in FIG. 39, and thus represents that the transfer path profile shown in FIG. 39 has been selected.

If the plural transfer path profiles have been registered in the network scanner 102, another profile can be selected by depressing the rightward key on the panel 1502. At this time, only the transfer path profiles in which the output device described in the user profile has been designated as the output destination are selected and displayed on the panel. Therefore, the user can select the transfer path profile only within his own user profile designation range.

Then a copying function which uses the selected transfer path profile is executed by depressing the scanning execution button 1503. According to the transfer path profile shown in FIG. 42, the network scanner 102 selects the "172.16.10.3" (i.e., network printer) described at "OUTPUT-ADDRESS" as the output device, reads the original at the resolution "600 dpi" described at "RESOLUTION", and then transmits the print data in the form of "LIPS 4" described at "DOCUMENT-FORMAT". The number of copy is "one" as described at "COPY-DEFAULT".

The print data is transferred to the network printer 104 through the network 101. At this time, the printer 104 only prints the transferred print data irrespective of the transfer path profile.

In the above description, the method to select the transfer path profile on the console panel of the network scanner 102 and transfer the print data to the network printer 104 has been explained. Hereinafter, a method to conversely select the transfer path profile on the console panel of the network printer 104 and transmit the print data to the network scanner 102 will be explained.

The network printer 104 acquires the user profile and the transfer path profile in the same manner as the above-described manner in which the network scanner 102 acquires the user profile and the transfer path profile from the management server 103.

The user sets the original onto the network scanner 102 and then handles the panel of the network printer 104 for the printing.

Figure 51:
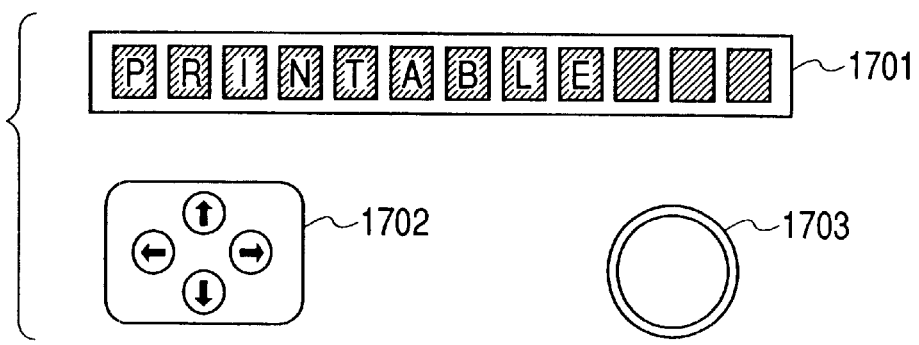
FIG. 51 is a view showing appearance of a console panel of the network printer.

FIG. 51 is a view showing appearance of the console panel 308 of the network printer 104.

In FIG. 51, numeral 1701 denotes a liquid crystal panel which can display 12-column characters, numeral 1702 denotes a crisscross key panel which is used to select each function, and numeral 1703 denotes an execution button which is used to execute the printing.

Thus, the user selects the user profile by depressing the rightward key on the panel 1702.

FIG. 52 is the view showing the contents of the liquid crystal panel 1701 in the case where the rightward key on the crisscross panel 1702 is depressed once. That is, since a character string on the panel 1701 shows the contents of "USER" in FIG. 44, the panel represents that the user profile shown in FIG. 44 has been selected.

If the plural user profiles have been registered in the network printer 104, it is possible to select another profile by further depressing the rightward key on the panel 1702. In the user profile selection, since only the user profile in which the device name of the printer 104 has been written at "OUTPUT-DEVICE" is displayed on the panel, the user can not select another user profile. In any case, if the downward key is depressed, the selected user profile is established or fixed.

If the selected user profile is established, then the user inputs a password (or PIN code) in a password input mode. FIG. 53 shows a state that "0" is displayed at the first column of four-column password, "*" is displayed at the remaining three columns, and a cursor is displayed under "0". In this state, by depressing the upward and downward keys on the panel 1702, a numeral in the password can be changed (i.e., increased or decreased). After the user sets the correct numeral at one column, he depresses the rightward key to rightward shift the setting column by one and then sets the numeral at the next column. If the user ends to input the password suitable for the selected user profile by repeating such an operation as above, he depresses the downward key to establish the password. Then the network printer 104 compares the input password with the password in the user profile. If the input passwords is coincident with the password in the user profile, then the user selects the transfer path profile. On the other hand, if not coincident, the printer 104 cancels its operation and returns to an initial standby state.

If coincident, then the user selects the transfer path profile by depressing the rightward key on the panel 1702. FIG. 50 is the view showing the example of the contents on the liquid crystal panel displayed after the password check ends. The panel displays the character string at "DESCRIPTION" in FIG. 39, and thus represents that the transfer path profile shown in FIG. 39 has been selected.

If the plural transfer path profiles have been registered in the network printer 104, another profile can be selected by depressing the rightward key on the panel 1702. At this time, only the transfer path profile which includes the input device described in the selected user profile is selectively displayed.

Then a copying function which uses the selected transfer path profile is executed by depressing the printing execution button 1703. According to the transfer path profile shown in FIG. 42, the network printer 104 selects the "172.16.10.2" (i.e., network scanner) described at "INPUT-ADDRESS" as the input device, and transmits the read command described at "INPUT-COMMAND" to the input device, thereby demanding the reading.

If the network scanner 102 receives the read command, it reads the original at the designated paper size and then returns the data of the read original to the network printer 104.

In the present embodiment, the input and output devices demand all the transfer path profiles to the management server 103. However, in the case where the plural input and output devices are connected to the network 101, it is probable that the transfer path profile not using certain devices exist. In this case, it is wasteful to store the information concerning such the transfer path profile in the RAM of the device. For this reason, it is thought to expand the transfer path profile transfer demand such that only the transfer path profiles concerning own device are transmitted.

FIG. 55 is a view showing the instruction text obtained by expanding the transfer path profile transfer demand instruction shown in FIG. 41. In FIG. 55, "MATCH INPUT-ADDRESS=172.16.10.2" represents that the instruction demands the transfer path profile suitable for the input device address "172.16.10.2".

Also it is thought to expand the instruction (or command) such that only the user profiles concerning own device are transmitted.

FIG. 54 is a view showing the instruction text obtained by expanding the user profile transfer demand instruction shown in FIG. 46. In FIG. 54, "MATCH INPUT-ADDRESS=172.16.10.2" represents that the instruction demands the user profile suitable for the input device address "172.16.10.2".

In the present embodiment, it is assumed that both the transfer path profile and the user profile are stored in the management server. However, in order to enable the printing even in a case where the management server does not operate, it is possible to register the transfer path profile and the user profile in a nonvolatile memory of each device, and moreover it is possible to build each device as it has the function identical with that of the management server.

Further, in the present embodiment, it is assumed that the user profile is selected on the console panel of the device and the password is input. However, it is possible for the user to store his own user profile into a portable nonvolatile storage medium (e.g., magnetic card, IC card or the like), and to select the user profile and input the password by inserting the portable nonvolatile storage medium into a storage medium reading interface of each device.

Further, in the present embodiment, when the user profile is used, it is judged from the user name whether or not the device is usable for the user defined by the user profile. However, it is possible to check the group information included in the user profile and thus set the available devices for each specific group.

The present invention can be applied to a system composed of plural devices (e.g., host computer, interface equipment, reader, printer and the like), or to each function of an apparatus comprising a single device (e.g., copying machine, fax machine or the like).

Needless to say, the object of the present invention can be achieved also in a case where a storage medium recording therein program codes of software for realizing the functions of the above embodiments is supplied to the system or the apparatus, and thus a computer (including CPU or MPU) of the system or the apparatus reads and executes the program codes stored in the storage medium. In this case, the program codes themselves read from the storage medium realize the functions of the above embodiments, whereby the storage medium storing therein the program codes constitutes the present invention.

As the storage medium for storing the program codes, for example, a floppy disk, a hard disk, an optical disk, a magnetooptical disk, a CD-ROM, a CD-R, a magnetic tape, a nonvolatile memory card, a ROM and the like can be used.

Further, needless to say, the present invention includes not only a case where the computer executes the read program codes to realize the functions of the above embodiments, but also a case where an OS (operating system) running on the computer performs a part or all of the actual processes on the basis of the instructions of the program codes and thus the functions of the above embodiments are realized by such the processes.

Further, needless to say, the present invention also includes a case where, after the program codes read from the storage medium are written into a memory provided in a function expansion board inserted in the computer or a function expansion unit connected to the computer, a CPU or the like provided in the function expansion board or the function expansion unit performs a part or all of the actual processes on the basis of the instructions of the program codes and thus the functions of the above embodiments are realized by such the processes.

In the case where the present invention is applied to the storage medium, the program codes corresponding to the previously explained flow charts are stored in the medium.

As explained above, it is possible to provide the multifunctional system and its data transfer method which can dispense the user from complicated handling without increasing the cost and in which flexible setting is possible for the individual.

That is, the data is transferred from the network scanner to the network printer, and the management server includes the complicated structural information to realize the copying as the transfer path profile. Thus, it is possible to realize the copying function only by selecting from the network scanner which transfer path profile is to be used, thereby giving user-friendliness. Further, it is unnecessary to provide the console panel for complicated operation designation in the scanner, thereby decreasing cost. Further, since the management server includes the user information as the user profile and the user profile is selected before the selection of the transfer path profile, it is possible to restrict the available device for each user.

Further, the data is transferred from the network scanner to the network printer, and the management server includes the complicated structural information to realize the copying as the transfer path profile. Thus, it is possible to realize the copying function only by selecting from the network printer which transfer path profile is to be used, thereby giving user-friendliness. Further, it is unnecessary to provide the console panel for complicated operation designation in the printer, thereby decreasing cost. Further, since the management server includes the user information as the user profile and the user profile is selected before the selection of the transfer path profile, it is possible to restrict the available device for each user.

Further, in the case where numerous transfer path profiles and user profiles have been registered in the management server, only the transfer path profile and the user profile concerning own device are transferred to such the device. Therefore, it is possible to reduce the load of the network as a whole and also save the capacity of the RAM in each device storing these profiles, thereby reducing cost.

Further, the transfer path profile and the user profile are stored in the nonvolatile memory of each device. Therefore, even if the management server does not start up, it is possible to perform the printing based on the information concerning the transfer path profile and the user profile stored in the nonvolatile memory of each device.

Further, the user profile and the password are stored in the portable nonvolatile memory. Therefore, it is possible to select the user profile and input the password only by inserting the nonvolatile memory into the device.

Further, it is possible to set the available device not only for each user but also for the group of the users, whereby it is possible to perform effective user management.

Although the present invention has been explained by using the several preferred embodiments, the present invention is not limited to the structures of these embodiments. That is, various modifications and changes are possible in the present invention without departing from the spirit and scope of the annexed claims.

What is claimed is:

1. An information processing system in which at least one or more input devices for inputting data, a plurality of output devices for outputting the input data, and an information processing device for controlling processing of the input data, are connected through a network, wherein, said information processing device comprises:

device information acquirement means for acquiring device information of each said input device and each of said output devices;

search means for searching for corresponding output devices that are capable of outputting data input from each said input device on a basis of an acquirement result of said device information acquirement means; and registration means for registering virtual input/output device information on a basis of a search result of said search means, and wherein said input device comprises:

virtual device information acquirement means for acquiring the virtual input/output device information registered by the registration means; and transfer means for directly transferring the data input at the input device to said output device designated by the virtual input/output device information.

2. A system according to claim 1, wherein said information processing device further comprises storage means for storing the device information acquired by the device information acquirement means and for storing the virtual input/output device information registered by the registration means, the virtual input/output device information including transfer method information.

3. An information processing method for an information processing system in which at least one or more input device for inputting data, a plurality of output devices for outputting the input data, and an information processing device for controlling processing of the input data, are connected through a network, the method comprising the steps of:

the information processing device performing the steps of:

acquiring device information of each input device and each of the plurality of output devices;

searching for output devices capable of outputting the data input from the input device on the basis of the acquired device information; and registering virtual input/output device information on a basis of a result of the searching step, and the input device performing the steps of:

acquiring the virtual input/output device information from the registered information; and transferring the data input to the input device directly to the output device designated by the virtual input/output device information.

4. A method according to claim 3, wherein each input device generates the device information of the input device.

5. A method according to claim 3, wherein each of the output devices generates the device information of the output device.

6. A method according to claim 3, wherein the device information includes at least transfer protocol information indicating a protocol for which the input device or the output device is capable of transmitting and receiving information, and data format information indicating a format of data capable of being input and output by the input device or the output device.

7. A method according to claim 3, wherein the information processing device selects specific device information from among plural device information when the device information of plural input devices are acquired.

8. A method according to claim 3, wherein the information processing device selects plural output device pairings with the input device when plural output devices capable of outputting the data are found in the searching step.

9. A method according to claim 8, wherein a selection of one output device pairing from among the plural pairings with the input device is performed by using a graphical user interface.

10. A method according to claim 3, wherein the virtual input/output device information includes at least input device discrimination information for discriminating the input device on the network, output device discrimination information for discriminating the output device on the network, transfer protocol information indicating a transfer protocol for which data transfer between the input and output device is capable of being performed, and data format information indicating a data format capable of being input and output by the input device and the output device.

11. A method according to claim 3, wherein the input device selects one virtual input/output device information from among plural virtual input/output device information when plural virtual input/output device information are acquired.

12. A method according to claim 11, wherein the selection of the one virtual input/output device information is performed by a user handling a console unit.

13. A method according to claim 3, wherein the data transfer is sequentially performed to plural output devices when the data is to be transferred to plural output devices.

14. A method according to claim 3, wherein the data transfer is simultaneously performed to plural output devices belonging to a specific group when the data is to be transferred to plural output devices.

15. A method according to claim 3, wherein the output device performs the steps of:

confirms whether or not output designation is made by the virtual input/output device information;

receives the data directly transferred from the input device based on the virtual input/output device information when the output designation is confirmed; and outputs the received data.

16. An input device which is connected to plural output devices and an information processing device through a network, comprising:

virtual device information acquirement mean for acquiring virtual input/output device information indicating a virtual input/output device composed by said input device and one of said plural output devices;

transfer method information acquirement means for acquiring transfer method information included in the virtual input/output device information; and transfer means for directly transferring data to the output device designated by the virtual input/output device information, on the basis of the transfer method information.

17. A device according to claim 16, further comprising device information generation means for generating device information of the input device.

18. A device according to claim 17, wherein the device information of the input device includes at least transfer protocol information indicating a transfer protocol of the input device for which data is capable of being transmitted and received by the input device and data format information indicating a format for which data is capable of being input and output by the input device.

19. A device according to claim 16, further comprising virtual input/output device information selection means for selecting one virtual input/output device information from among plural virtual input/output device information when plural virtual input/output device information are acquired by said virtual device information acquirement means.

20. A device according to claim 19, wherein the selection of the one virtual input/output device information by said virtual input/output device information selection means is performed by a user handling a console unit.

21. A device according to claim 16, wherein said transfer means sequentially performs the data transfer to plural output devices when the data is to be transferred to plural output devices.

22. A device according to claim 16, wherein said transfer means simultaneously performs the data transfer to plural output devices belonging to a specific group when the data is to be transferred to plural output devices.

23. An output device which is connected to at least one or more input devices and an information processing device through a network, comprising:
    virtual device information confirmation means for confirming whether or not the output device has been designated to output data, the designation made by virtual input/output device information acquired by the input device and indicating a virtual input/output device composed of said output device and said input device;
    data reception means for receiving the data directly from said input device based on transfer method information included in the virtual input/output device information when the output designation in confirmed by said virtual device information confirmation means; and
    output means for outputting the data received by said data reception means.

24. An information processing device which is connected to at least one or more input devices and a plurality of output devices through a network, comprising:
    device information acquirement means for acquiring device information of each said input device and each of said plurality of output devices;
    judgement means for judging whether or not any of the plurality of output devices is capable of outputting data input from any of said input devices on a basis of an acquirement result of said device information acquirement means;
    transfer method information generation means for generating transfer method information on a basis of respective device information of each of said output and said input devices for which said judgement means judges that the output device is capable of outputting the data from said input device; and
    registration means for registering virtual input/output device information, including the transfer method information, the virtual input/output device information indicating a virtual input/output device composed of said input device and one of said plurality of output devices.

25. A device according to claim 24, wherein the device information includes at least transfer protocol information indicating a protocol for which the input device or the output device is capable of transmitting and receiving information, and data format information indicating a format of data capable of being input and output by said input device or said output device.

26. A device according to claim 24, further comprising device information selection means for selecting the device information from among plural device information when the device information of plural input devices are acquired by said device information acquirement means.

27. A device according to claim 24, further comprising output device selection means for selecting at least one output device pairing with said input device when it is judged by said judgment means that plural output devices are capable of outputting the data.

28. A device according to claim 27, wherein the selection of said output device pairing with said input device by said output device selection means is performed by using a graphical user interface.

29. A device according to claim 24, wherein the transfer method information includes at least input device discrimination information for discriminating said input device on the network, output device discrimination information for discriminating said output device on the network, transfer protocol information indicating a transfer protocol for which data transfer between said input and output device is capable of being performed, and data format information indicating a data format capable of being input and output by said input device and the output device.

30. A device according to claim 24, further comprising storage means for storing the device information acquired by the device information acquirement means and for storing the virtual input/output device information registered by the registration means, including the transfer method information.

31. A multifunctional system which is composed of an input device, an output device and a host computer connected via a network, wherein said host computer comprises:
    device information acquirement means for acquiring device
    information of said input device and said output device,
        transfer method definition means for generating transfer method information to define a transfer method between said input device and said output device, in accordance with the device information of said input device and the device information of said output device acquired by said device information acquirement means; and
        logical input/output device registration means for generating logical input/output device information according to the transfer method information defined by said transfer method definition means, and for registering the logical input/output device information, wherein
    said input device comprises:
        device information notification means for providing notification on the network of device information of said input device;
        logical input/output device information acquirement means for acquiring the logical input/output device information registered in said logical input/output device registration means of the host computer; and
        transfer means for transferring data from said input device to said output device in accordance with the logical input/output device information acquired by said logical input/output information acquirement means, and wherein said output device comprises:
  device information notification means for providing notification on the network of device information of said output device;
  logical input/output device information acquirement means for acquiring the logical input/output device information registered in said logical input/output device registration means of the host computer; and
  transfer means for transferring data from said input device to said output device in accordance with the logical input/output device information acquired by said logical input/output information acquirement means.

32. A multifunctional system which is composed of an input device, an output device and a host computer connected via a network, comprising:
  device information acquirement means for acquiring device information of said input device and said output device;
  transfer method definition means for generating transfer method information to define a transfer method between said input device and said output device, in accordance with the device information of said input device and the device information of said output device acquired by said device information acquirement means;
  logical input/output device registration means for generating logical input/output device information according to the transfer method information defined by said transfer method definition means, and registering the logical input/output device information, which is composed of said input device and said output device;
  device information notification means for providing notification on the network of the device information of said input device and the device information of the output device;
  logical input/output device information acquirement means for acquiring the logical input/output device information registered in said logical input/output device registration means; and
  transfer means for transferring data from said input device to said output device in accordance with the logical input/output device information acquired by said logical input/output information acquirement means.

33. A data transfer method in a multifunctional system which is composed of an input device, an output device and a host computer connected via a network, said method comprising the steps of:
  generating transfer method information to define a transfer method between the input device and the output device in accordance with device information of the input device and device information of the output device;
  generating logical input/output device information according to the transfer method information and registering the logical input/output device information, which is composed of the input device and the output device; and
  transferring data from the input device to the output device in accordance with the registered logical input/output device information.

34. A method according to claim 33, further comprising the step of changing or adding transfer method definition information for users, and
  wherein the logical input/output device information are registered according to the transfer method definition information of the input and output devices and the transfer method definition information of the users.

35. A method according to claim 33, further comprising the step of causing the input device to unilaterally select the logical input/output device information of output devices capable of outputting data from the input device.

36. A method according to claim 33, further comprising the step of causing the output device to unilaterally select the logical input/output device information for input devices capable of outputting data to the output device.

37. A storage medium for computer-readably storing a data transfer control program for a multifunctional system composed of an input device, an output device and a host computer connected via a network, said program comprising:
  a module for acquiring device information of the input device and device information of the output device;
  a module for generating transfer method information to define a transfer method between the input device and the output device in accordance with the device information of the input device and the device information of the output device; and
  a module for generating logical input/output device information according to the defined transfer method information and registering the logical input/output device information, which is composed of the input device and the output device.

38. A medium according to claim 37, wherein said data transfer control program is executed by the host computer.

39. A storage medium for computer-readably storing a data transfer control program for a multifunctional system composed of an input device, an output device and a host computer connected via a network, said program comprising:
  a module for providing notification on the network of device information of the input device and device information of the output device;
  a module for acquiring logical input/output device information indicating a logical input/output device composed of the input device and the output device; and
  a module for transferring data from the input device to the output device in accordance with the acquired logical input/output device information.

40. A medium according to claim 39, wherein said data transfer control program is executed by the input device and/or the output device.

41. A multifunctional system in which an input device, an output device and a management server, all connected to a network, are combined to constitute a copying function, wherein
  said management server comprises:
    device information acquirement means for acquiring device information inherent for each of said input device and said output device;
    device information storage means for storing the device information acquired by said device information acquirement means into a database;
    transfer path information generation means for generating transfer path information to constitute an input/output path between said input device and said output device, on a basis of the device information stored in said device information storage means;
    transfer path information storage means for storing the transfer path information generated by said transfer path information generation means, into the database; and transfer path information supply means for supplying the transfer path information stored in said transfer path information storage means, in accordance with a transfer demand from either said input device or said output device, and said input device and/or said output device comprises:
  device information supply means for transmitting the device information inherent for the respective device, to said management server;
  transfer path information acquirement means for acquiring the transfer path information stored in said transfer path information storage means, from said management server;
  transfer path information selection means for selecting a transfer path information from one or more transfer path information acquired by said transfer path information acquirement means; and
  data transfer means for transferring data from said input device to said output device in accordance with the transfer path information selected by said transfer path information selection means.

42. A multifunctional system in which an input device, an output device and a management server, all connected to a network, are combined to constitute a copying function, wherein said management server comprises:
  device information acquirement means for acquiring device information inherent for each of said input device and said output device;
  device information storage means for storing the device information acquired by said device information acquirement means into a database;
  transfer path information generation means for generating transfer path information to constitute an input/output path between said input device and saidU output device, on a basis of the device information stored in said device information storage means;
  transfer path information storage means for storing the transfer path information generated by said transfer path information generation means, into the data base; and
  transfer path information supply means for supplying the transfer path information stored in said transfer path information storage means, in accordance with a transfer demand from either said input device or said output device, said output device comprises:
  device information supply means for transmitting the device information inherent for the output device, to said management server; and said input device comprises:
  device information supply means for transmitting the device information inherent for the input device, to said management server;
  transfer path information acquirement means for acquiring the transfer path information stored in said transfer path information storage means, from said management server;
  transfer path information selection means for selecting a transfer path information from one or more transfer path information acquired by said transfer path information acquirement means; and
  output means for causing said output device to perform an output operation in accordance with the transfer path information selected by said transfer path information selection means.

43. A multifunctional system in which an input device, an output device and a management server, all connected to a network, are combined to constitute a copying function, wherein said management server comprises:
  device information acquirement means for acquiring device information inherent for each of said input device and said output device;
  device information storage means for storing the device information acquired by said device information acquirement means into a database;
  transfer path information generation means for generating transfer path information to constitute an input/output path between said input device and said output device, on a basis of the device information stored in said device information storage means;
  transfer path information storage means for storing the transfer path information generated by said transfer path information generation means, into the data base; and
  transfer path information supply means for supplying the transfer path information stored in said transfer path information storage means, in accordance with a transfer demand from said input device or said output device, said input device comprises:
  device information supply means for transmitting the device information inherent for the input device, to said management server, and said output device comprises:
  device information supply means for transmitting the device information inherent for the output device, to said management server;
  transfer path information acquirement means for acquiring the transfer path information stored in said transfer path information storage means, from said management server;
  transfer path information selection means for selecting a transfer path information from one or more transfer path information acquired by said transfer path information acquirement means; and
  output means for causing said input device to perform an input operation in accordance with the transfer path information selected by said transfer path information selection means.

44. A multifunctional system in which data is transferred from an input device to an output device which are both connected to a network to constitute a copying function, comprising:
  device information acquirement means for acquiring device information inherent for each of said input device and said output device;
  transfer path information generation means for generating transfer path information to constitute an input/output path between said input device and said output device on a basis of the acquired device information, and storing the generated transfer path information into a database;
  transfer path information supply means for supplying the stored transfer path information in accordance with a transfer demand from said input device or said output device; and
  data transfer means for transferring the data from said input device to said output device in accordance with the supplied transfer path information.

45. A data transfer method in a multifunctional system in which data is transferred from an input device to an output device which are both connected to a network to constitute a copying function, said method comprising the steps of:
  generating transfer path information to constitute an input/output path between the input device and the output device on a basis of device information inherent for each of the input device and the output device, and storing the generated transfer path information into a database; and transferring the data from the input device to the output device in accordance with the transfer path information which is supplied to either the input device or the output device based on a transfer demand from the input device or the output device.

46. A method according to claim 45, wherein said step of generating the transfer path information includes the step of setting the transfer path information.

47. A method according to claim 45, further comprising the step of selecting one transfer path information from one or more transfer path information supplied to either the input device or the output device.

48. A method according to claim 45, wherein in the transfer path information supply, in accordance with the transfer demand of each device, only the transfer path information relative to the demanded device is supplied.

49. A storage medium for computer-readably storing a data transfer control program used in a multifunctional system in which data is transferred from an input device to an output device which are both connected to a network to constitute a copying function, said data transfer control program comprising:

a module for acquiring device information inherent for each of the input device and the output device;

a module for storing the acquired device information into a database;

a module for generating transfer path information to constitute an input/output path between the input device and the output device on a basis of the stored device information;

a module for storing the generated transfer path information into the database; and a module for supplying the stored transfer path information to either the input device or the output device in accordance with a transfer demand from the input device or the output device.

50. A storage medium for computer-readably storing a data transfer control program used in a multifunctional system in which data is transferred from an input device to an output device which are both connected to a network to constitute a copying function, said data transfer control program comprising:

a module for transmitting device information inherent for each of the input device or the output device;

a module for acquiring transfer path information to be stored;

a module for selecting one transfer path information from one or more transfer path information acquired; and a module for transferring the data from the input device to the output device in accordance with the selected transfer path information.

* * * * *

UNITED STATES PATENT AND TRADEMARK OFFICE
CERTIFICATE OF CORRECTION

PATENT NO.    : 6,553,431 B1
DATED         : April 22, 2003
INVENTOR(S)   : Yamamoto et al.

It is certified that error appears in the above-identified patent and that said Letters Patent is hereby corrected as shown below:

Title page, Item [54] and Column 1, lines 1-2,
"INFORMATION PROCESSING SYSTEM AND INFORMATION PROCESSING METHOD" should read -- SYSTEM AND METHOD FOR TRANSMITTING DATA FROM INPUT DEVICE TO OUTPUT DEVICE BASED ON THE DEVICE'S CAPABILITIES WITHOUT TRANSMITTING DATA TO A HOST COMPUTER OR SERVER --.

Title page,
Item [57], ABSTRACT,
Line 10, "acquired" should read -- acquired and --.

Column 1,
Line 15, "it" should read -- an information processing system --;
Line 16, "an information processing system" should be deleted; and
Line 23, "known" should read -- known that --.

Column 2,
Line 1, "the" should read -- a --;
Line 11, "a" should read -- an --;
Line 23, "the" (first occurrence) should be deleted; and
Line 32, "(scanner" should read -- (in which a scanner --; and "being." should be deleted.

Column 3,
Lines 5 and 16, "comprises" should read -- comprises: --.

Column 10,
Line 32, "such" should read -- such that --; and
Line 36, "select such the" should read -- selects such a --.

Column 11,
Line 2, "clicks" should read -- click --; and
Line 16, "processing-tar get" should read -- processing-target --.

Column 12,
Line 3, "the" (second occurrence) should be deleted;
Line 35, "then," should read -- that, --; and
Line 47, "After then," should read -- Then, --.

Column 17,
Lines 1 and 43, "the" (third occurrence) should be deleted.

UNITED STATES PATENT AND TRADEMARK OFFICE
CERTIFICATE OF CORRECTION

PATENT NO.   : 6,553,431 B1
DATED        : April 22, 2003
INVENTOR(S)  : Yamamoto et al.

It is certified that error appears in the above-identified patent and that said Letters Patent is hereby corrected as shown below:

<u>Column 18,</u>
Line 56, "the" (first occurrence) should be deleted.

<u>Column 19,</u>
Line 17, "the" should be deleted; and
Line 47, "can not" should read -- cannot --.

<u>Column 21,</u>
Lines 5 and 10, "the" should read -- a --.

<u>Column 25,</u>
Lines 4 and 27, "does not reach" should read -- has not been reached --; and
Line 42, "the" (first occurrence) should read -- a --.

<u>Column 27,</u>
Line 27, "the" (first occurrence) should read -- a --; and
Line 29, "the name" should be deleted.

<u>Column 28,</u>
Line 53, "crisscross" should read -- criss-cross --; and
Line 63, "can not" should read -- cannot --.

<u>Column 31,</u>
Line 4, "the" (first occurrence) should be deleted.

<u>Column 32,</u>
Line 4, "the" (second occurrence) should read -- a --;
Line 14, "the" should be deleted; and
Line 51, "the" should read -- a --.

<u>Column 34,</u>
Line 44, "confirms" should read -- confirming --;
Line 46, "receives" should read -- receiving --; and
Line 53, "mean" should read -- means --.

<u>Column 36,</u>
Line 39, (close up right margin).

UNITED STATES PATENT AND TRADEMARK OFFICE
CERTIFICATE OF CORRECTION

PATENT NO. : 6,553,431 B1
DATED : April 22, 2003
INVENTOR(S) : Yamamoto et al.

It is certified that error appears in the above-identified patent and that said Letters Patent is hereby corrected as shown below:

Column 39,
Line 33, "saidU" should read -- said --.

Signed and Sealed this

Twentieth Day of January, 2004

JON W. DUDAS
*Acting Director of the United States Patent and Trademark Office*